US010886672B2

(12) United States Patent
Lee et al.

(10) Patent No.: US 10,886,672 B2
(45) Date of Patent: *Jan. 5, 2021

(54) CONNECTOR FOR CONNECTING ANTENNA AND ELECTRONIC DEVICE HAVING THE SAME

(71) Applicant: Samsung Electronics Co., Ltd., Suwon-si (KR)

(72) Inventors: Won-Wook Lee, Hwaseong-si (KR); Weon-Jai Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/686,932

(22) Filed: Nov. 18, 2019

(65) Prior Publication Data

US 2020/0091662 A1 Mar. 19, 2020

Related U.S. Application Data

(63) Continuation of application No. 16/137,362, filed on Sep. 20, 2018, now Pat. No. 10,483,698.

(30) Foreign Application Priority Data

Sep. 27, 2017 (KR) .................. 10-2017-0125366

(51) Int. Cl.
*H01R 13/66* (2006.01)
*H01R 24/64* (2011.01)
(Continued)

(52) U.S. Cl.
CPC ..... *H01R 13/6691* (2013.01); *H01R 13/6273* (2013.01); *H01R 24/64* (2013.01);
(Continued)

(58) Field of Classification Search
CPC ............ H01R 13/6691; H01R 13/6273; H01R 24/64; H01R 2107/00; H04B 1/18; G06F 13/40; G06F 13/4063; G06F 13/4068
(Continued)

(56) References Cited

U.S. PATENT DOCUMENTS 9,625,988 B1 4/2017 Agarwal et al.
9,722,376 B2 8/2017 Kim et al.
(Continued)

FOREIGN PATENT DOCUMENTS

WO 2016/168987 A1 10/2016

OTHER PUBLICATIONS

International Search Report dated Jan. 30, 2019 issued in International Application No. PCT/KR2018/011156.
(Continued)

*Primary Examiner* — Lee Nguyen
(74) *Attorney, Agent, or Firm* — Jefferson IP Law, LLP

(57) ABSTRACT

An electronic device with an antenna-connectable connector is provided. The electronic device includes a wireless communication circuit configured to receive wireless communication data and a universal serial bus (USB) type-C connector including a housing forming an outer surface of the connector, an opening formed in at least a portion of the outer surface to allow a header-type external connector to be coupled to the connector in a forward direction or a reverse direction, and a board disposed inside the opening, the board having a first surface on which a plurality of first pins corresponding to the forward direction are arranged and a second surface on which a plurality of second pins corresponding to the reverse direction are arranged.

20 Claims, 15 Drawing Sheets

(51) Int. Cl.
*H04B 1/18* (2006.01)
*H01R 13/627* (2006.01)
*H04M 1/02* (2006.01)
*H01R 13/70* (2006.01)
*H01R 107/00* (2006.01)
*H04M 1/725* (2006.01)
*H01R 24/60* (2011.01)

(52) U.S. Cl.
CPC ............ *H04B 1/18* (2013.01); *H04M 1/0274* (2013.01); *H01R 24/60* (2013.01); *H01R 2107/00* (2013.01); *H04M 1/72527* (2013.01)

(58) Field of Classification Search
USPC ........................................................ 455/269
See application file for complete search history.

(56) References Cited

U.S. PATENT DOCUMENTS

| | | |
|---|---|---|
| 10,483,698 B2 * | 11/2019 | Lee .................... H01R 13/6273 |
| 2009/0111533 A1 | 4/2009 | Johansson et al. |
| 2015/0242349 A1 | 8/2015 | Robl et al. |
| 2015/0270733 A1 | 9/2015 | Inha et al. |
| 2016/0335219 A1 | 11/2016 | Chang et al. |
| 2017/0124016 A1 | 5/2017 | Gerber et al. |
| 2017/0161226 A1 | 6/2017 | Gerber et al. |

OTHER PUBLICATIONS

Universal Serial Bus Type-C Cable and Connector Specification, XP055208232, Aug. 18, 2015.
European Search Report dated Jan. 24, 2019, issued in the European Application No. 18196613.6.

* cited by examiner

|  | PIN No. | Signal Name | |
|---|---|---|---|
| 511a,511b | 1 | GND | Ground |
| 512a,512b | 2 | TX+ | Super speed TX positive |
| 513a,513b | 3 | TX- | Super speed TX negative |
| 514a,514b | 4 | $V_{BUS}$ | Power |
| 515a,515b | 5 | CC | Configuration channel |
| 516a,516b | 6 | D+ | + line of the differential bi-directional USB signal |
| 517a,517b | 7 | D- | - line of the differential bi-directional USB signal |
| 518a,518b | 8 | SBU | Side Band Use : additional purpose pin (ex: Audio signal, display signal, ETC.) |
| 519a,519b | 9 | $V_{BUS}$ | Power |
| 520a,520b | 10 | RX- | Super speed RX negative |
| 521a,521b | 11 | RX+ | Super speed TX positive |
| 522a,522b | 12 | GND | Ground |

FIG.5B

| | PIN No. | Signal Name | |
|---|---|---|---|
| 611a,611b | 1 | GND | Ground |
| 612a,612b | 2 | TX+ | Super speed TX positive |
| 613a,613b | 3 | TX- | Super speed TX negative |
| 614a,614b | 4 | $V_{BUS}$ | Power |
| 615a,615b | 5 | CC | Configuration channel |
| 616a,616b | 6 | D+ | + line of the differential bi-directional USB signal |
| 617a,617b | 7 | D- | - line of the differential bi-directional USB signal |
| 618a,618b | 8 | SBU | Side Band Use : additional purpose pin (ex: Audio signal, display signal, ETC.) |
| 619a,619b | 9 | $V_{BUS}$ | Power |
| 620a,620b | 10 | RX- | Super speed RX negative |
| 621a,621b | 11 | RX+ | Super speed TX positive |
| 622a,622b | 12 | GND | Ground |
| 611,612 | 13 | ANT | antenna |

FIG.6B

CONNECTOR FOR CONNECTING ANTENNA AND ELECTRONIC DEVICE HAVING THE SAME

CROSS-REFERENCE TO RELATED APPLICATION(S)

This application is a continuation application of prior application Ser. No. 16/137,362, filed on Sep. 20, 2018, which has issued as U.S. Pat. No. 10,483,698 on Nov. 19, 2019 and was based on and claimed priority under 35 U.S.C. § 119(a) of a Korean patent application number 10-2017-0125366, filed on Sep. 27, 2017, in the Korean Intellectual Property Office, the disclosure of which is incorporated by reference herein in its entirety.

BACKGROUND

1. Field

The disclosure relates to connectors for electronic devices. More particularly, the disclosure relates to an electronic device with an antenna-connectable connector that allows the electronic device to connect an antenna for receiving wireless communication data, as well as with an external device to perform designated functions.

2. Description of Related Art

Various electronic devices are recently coming into use, and users may enjoy a diversity of content while carrying their electronic devices. Such an electronic device may have an interface (e.g., a connector) for connecting with various external devices to provide expanded functionality. An electronic device may include various types of interfacing connectors.

The above information is presented as background information only to assist with an understanding of the disclosure. No determination has been made, and no assertion is made, as to whether any of the above might be applicable as prior art with regard to the disclosure.

SUMMARY

Among various types of connectors, some connectors, e.g., 3.5phi analog audio connectors, may support connection between an electronic device and an antenna (e.g., a digital multimedia broadcasting (DMB) or frequency modulation (FM) antenna) for receiving wireless communication data. Other connectors, e.g., universal serial bus (USB)-type C connectors, may not support connection between an electronic device and an antenna.

Connectors not supportive of connection between an electronic device and an antenna are able to support the electronic device for designated functions, but may not support the functionality of receiving wireless communication data that requires the use of an antenna.

Aspects of the disclosure are to address at least the above-mentioned problems and/or disadvantages and to provide at least the advantages described below. Accordingly, an aspect of the disclosure is to provide an electronic device with an antenna-connectable connector that allows the electronic device to connect an antenna for receiving wireless communication data, as well as with an external device to perform designated functions.

According to an embodiment of the disclosure, there may be provided an electronic device with a USB type-C connector that allows the electronic device to connect with an antenna for receiving wireless communication data, as well as with an external device to perform designated functions.

In accordance with another aspect of the disclosure, an electronic device is provided. The electronic device includes a wireless communication circuit configured to receive wireless communication data and a universal serial bus (USB) type-C connector including a housing forming an outer surface of the connector, an opening formed in at least a portion of the outer surface to allow a header-type external connector to be coupled to the connector in a forward direction or a reverse direction, and a board disposed inside the opening, the board having a first surface on which a plurality of first pins corresponding to the forward direction are arranged and a second surface on which a plurality of second pins corresponding to the reverse direction are arranged, wherein the plurality of first pins may include one or more first ground pins and one or more first signal pins, wherein the plurality of second pins include one or more second ground pins and one or more second signal pins, wherein the one or more first signal pins may include at least one first signal pin selectively connectable with the wireless communication circuit and a designated function circuit, and wherein the one or more second signal pins include at least one second signal pin corresponding to the reverse direction of the at least one first signal pin, the at least one second signal pin selectively connectable with the designated function circuit and the wireless communication circuit.

In accordance with an aspect of the disclosure, an electronic device is provided. The electronic device includes a wireless communication circuit configured to receive wireless communication data and a USB type-C connector, wherein the connector may include a housing forming an outer surface of the connector and having an opening formed in at least a portion of the outer surface to allow a header-type external connector to be coupled to the connector in a forward direction or a reverse direction and a board disposed inside the opening and having a first surface on which a plurality of first pins corresponding to the forward direction are arranged and a second surface on which a plurality of second pins corresponding to the reverse direction are arranged, wherein the plurality of first pins may include one or more first ground pins and one or more first signal pins, and the plurality of second pins may include one or more second ground pins and one or more second signal pins, and the one or more first ground pins may include at least one first ground pin selectively connectable with a ground and the wireless communication circuit, and the one or more second ground pins may include at least one second ground pin corresponding to the reverse direction of the at least one first ground pin and selectively connectable with the ground and the wireless communication circuit.

In accordance with another aspect of the disclosure, an electronic device is provided. The electronic device includes a wireless communication circuit configured to receive wireless communication data and a USB type-C connector, wherein the connector may include a housing forming an outer surface of the connector and having an opening formed in at least a portion of the outer surface to allow a header-type external connector to be coupled to the connector in a forward direction or a reverse direction, a board disposed inside the opening and having a first surface on which a plurality of first pins corresponding to the forward direction are arranged and a second surface on which a plurality of second pins corresponding to the reverse direction are arranged, and a first latch pin disposed on a first side of the board, configured to allow for electrical connection with the external connector, and corresponding to the forward direction and a second latch pin disposed on a second side of the board, configured to allow for electrical connection with the external connector, and corresponding to the reverse direction, wherein the plurality of first pins include one or more first ground pins and one or more first signal pins, and the plurality of second pins include one or more second ground pins and one or more second signal pins, and wherein at least one of the first latch pin or the second latch pin is selectively connected with the wireless communication circuit.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 5A and 5B are views illustrating pins of a connector according to an embodiment of the disclosure;

FIGS. 6A and 6B are views illustrating a connector with a latch pin according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
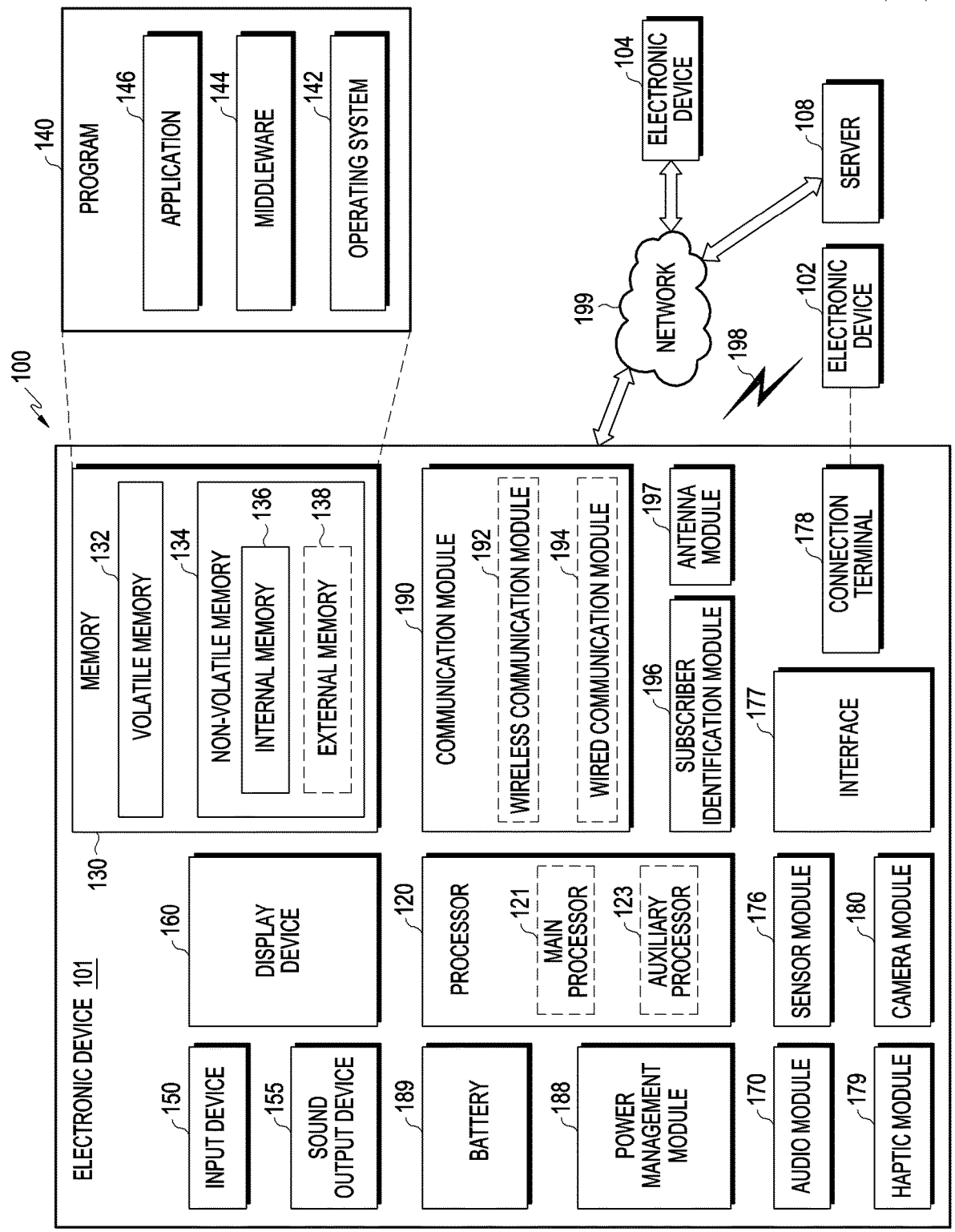
FIG. 1 is a block diagram illustrating an electronic device in a network environment according to an embodiment of the disclosure.

FIG. 1 is a block diagram illustrating an electronic device in a network environment according to various embodiments.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, the electronic device 101 may exclude at least one (e.g., the display device 160 or the camera module 180) of the components or add other components. In some embodiments of the disclosure, some components may be implemented to be integrated together, e.g., as if the sensor module 176 (e.g., a fingerprint sensor, an iris sensor, or an illuminance sensor) is embedded in the display device 160.

The processor 120 may drive, e.g., software (e.g., a program 140) to control at least one other component (e.g., a hardware or software component) of the electronic device 101 connected with the processor 120 and may process or compute various data. The processor 120 may load and process a command or data received from another component (e.g., the sensor module 176 or the communication module 190) on a volatile memory 132, and the processor 120 may store resultant data in a non-volatile memory 134. According to an embodiment of the disclosure, the processor 120 may include a main processor 121 (e.g., a central processing unit (CPU) or an application processor), and additionally or alternatively, an auxiliary processor 123 (e.g., a graphics processing unit (GPU), an image signal processor, a sensor hub processor, or a communication processor) that is operated independently from the main processor 121 and that consumes less power than the main processor 121 or is specified for a designated function. Here, the auxiliary processor 123 may be operated separately from or embedded in the main processor 121.

In such case, the auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., performing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120) of the electronic device 101, e.g., software (e.g., the program 140) and input data or output data for a command related to the software. The memory 130 may include the volatile memory 132 or the non-volatile memory 134.

The program 140, as software stored in the memory 130, may include, e.g., an operating system (OS) 142, middleware 144, or an application 146.

The input device 150 may be a device for receiving a command or data, which is to be used for a component (e.g., the processor 120) of the electronic device 101, from an outside (e.g., a user) of the electronic device 101. The input device 50 may include, e.g., a microphone, a mouse, or a keyboard.

The sound output device 155 may be a device for outputting sound signals to the outside of the electronic device 101. The sound output device 155 may include, e.g., a speaker which is used for general purposes, such as playing multimedia or recording and playing, and a receiver used for call receiving purposes only. According to an embodiment of the disclosure, the receiver may be formed integrally or separately from the speaker.

The display device 160 may be a device for visually providing information to a user of the electronic device 101. The display device 160 may include, e.g., a display, a hologram device, or a projector and a control circuit for controlling the display, hologram device, or projector. According to an embodiment of the disclosure, the display device 160 may include touch circuitry or a pressure sensor capable of measuring the strength of a pressure for a touch.

The audio module 170 may convert a sound into an electrical signal and vice versa. According to an embodiment of the disclosure, the audio module 170 may obtain a sound through the input device 150 or output a sound through the sound output device 155 or an external electronic device (e.g., an electronic device 102 (e.g., a speaker or a headphone) wiredly or wirelessly connected with the electronic device 101.

The sensor module 176 may generate an electrical signal or data value corresponding to an internal operating state (e.g., power or temperature) or external environmental state of the electronic device 101. The sensor module 176 may include, e.g., a gesture sensor, a gyro sensor, an atmospheric pressure sensor, a magnetic sensor, an acceleration sensor, a grip sensor, a proximity sensor, a color sensor, an infrared (IR) sensor, a bio sensor, a temperature sensor, a humidity sensor, or an illuminance sensor.

The interface 177 may support a designated protocol enabling a wired or wireless connection with an external electronic device (e.g., the electronic device 102). According to an embodiment of the disclosure, the interface 177 may include a high definition multimedia interface (HDMI), a universal serial bus (USB) interface, a secure digital (SD) card interface, or an audio interface.

A connecting terminal 178 may include a connector, e.g., an HDMI connector, a USB connector, an SD card connector, or an audio connector (e.g., a headphone connector), which is able to physically connect the electronic device 101 with an external electronic device (e.g., the electronic device 102).

The haptic module 179 may convert an electrical signal into a mechanical stimulus (e.g., a vibration or motion) or electrical stimulus which may be recognized by a user via his tactile sensation or kinesthetic sensation. The haptic module 179 may include, e.g., a motor, a piezoelectric element, or an electric stimulator.

The camera module 180 may capture a still image or moving images. According to an embodiment of the disclosure, the camera module 180 may include one or more lenses, an image sensor, an image signal processor, or a flash.

The power management module 188 may be a module for managing power supplied to the electronic device 101. The power management module 188 may be configured as at least part of, e.g., a power management integrated circuit (PMIC).

The battery 189 may be a device for supplying power to at least one component of the electronic device 101. The battery 189 may include, e.g., a primary cell which is not rechargeable, a secondary cell which is rechargeable, or a fuel cell.

The communication module 190 may support establishing a wired or wireless communication channel between the electronic device 101 and an external electronic device (e.g., the electronic device 102, the electronic device 104, or the server 108) and performing communication through the established communication channel The communication module 190 may include one or more communication processors that are operated independently from the processor 120 (e.g., an application processor) and supports wired or wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of the wireless communication module 192 and the wired communication module 194 may be used to communicate with an external electronic device through a first network 198 (e.g., a short-range communication network, such as Bluetooth, Wi-Fi direct, or infrared data association (IrDA)) or a second network 199 (e.g., a long-range communication network, such as a cellular network, the Internet, or a communication network (e.g., LAN or wide area network (WAN)). The above-enumerated types of communication modules 190 may be implemented in a single chip or individually in separate chips.

According to an embodiment of the disclosure, the wireless communication module 192 may differentiate and authenticate the electronic device 101 in the communication network using user information stored in the subscriber identification module 196.

The antenna module 197 may include one or more antennas for transmitting or receiving a signal or power to/from an outside. According to an embodiment of the disclosure, the communication module 190 (e.g., the wireless communication module 192) may transmit or receive a signal to/from an external electronic device through an antenna appropriate for a communication scheme.

Some of the above-described components may be connected together through an inter-peripheral communication scheme (e.g., a bus, general purpose input/output (GPIO), serial peripheral interface (SPI), or mobile industry processor interface (MIPI)), communicating signals (e.g., commands or data) therebetween.

According to an embodiment of the disclosure, commands or data may be transmitted or received between the electronic device 101 and the external electronic device 104 via the server 108 coupled with the second network 199. The first and second external electronic devices 102 and 104 each may be a device of the same or a different type from the electronic device 101. According to an embodiment of the disclosure, all or some of operations performed on the electronic device 101 may be run on one or more other external electronic devices. According to an embodiment of the disclosure, when the electronic device 101 should perform a certain function or service automatically or at a request, the electronic device 101, instead of, or in addition to, performing the function or service on its own, may request an external electronic device to perform at least some functions associated therewith. The external electronic device receiving the request may perform the requested functions or additional functions and transfer a result of the performance to the electronic device 101. The electronic device 101 may provide a requested function or service by processing the received result as it is or additionally. To that end, a cloud computing, distributed computing, or client-server computing technique may be used, for example.

The electronic device according to various embodiments may be one of various types of electronic devices. The electronic devices may include at least one of, e.g., a portable communication device (e.g., a smartphone), a computer device, a portable multimedia device, a portable medical device, a camera, a wearable device, or a home appliance. According to an embodiment of the disclosure, the electronic device is not limited to the above-listed embodiments.

It should be appreciated that various embodiments of the disclosure and the terms used therein are not intended to limit the techniques set forth herein to particular embodiments and that various changes, equivalents, and/or replacements therefor also fall within the scope of the disclosure. The same or similar reference denotations may be used to refer to the same or similar elements throughout the specification and the drawings. It is to be understood that the singular forms "a," "an," and "the" include plural references unless the context clearly dictates otherwise. As used herein, the term "A or B," "at least one of A and/or B," "A, B, or C," or "at least one of A, B, and/or C" may include all possible combinations of the enumerated items. As used herein, the terms "1st" or "first" and "2nd" or "second" may modify corresponding components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the term "module" includes a unit configured in hardware, software, or firmware and may interchangeably be used with other terms, e.g., "logic," "logic block," "part," or "circuit." A module may be a single integral part or a minimum unit or part for performing one or more functions. For example, the module may be configured in an application-specific integrated circuit (ASIC).

Various embodiments as set forth herein may be implemented as software (e.g., the program 140) containing commands that are stored in a machine (e.g., computer)-readable storage medium (e.g., an internal memory 136) or an external memory 138. The machine may be a device that may invoke a command stored in the storage medium and may be operated as per the invoked command The machine may include an electronic device (e.g., the electronic device 101) according to embodiments disclosed herein. When the command is performed by a processor (e.g., the processor 120), the processor may perform a function corresponding to the command on its own or using other components under the control of the processor. The command may contain a code that is generated or performed by a compiler or an interpreter. The machine-readable storage medium may be provided in the form of a non-transitory storage medium. Here, the term "non-transitory" simply means that the storage medium does not include a signal and is tangible, but this term does not differentiate between where data is semi-permanently stored in the storage medium and where data is temporarily stored in the storage medium.

According to an embodiment of the disclosure, a method according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)) or online through an application store (e.g., Playstore™). When distributed online, at least part of the computer program product may be temporarily generated or at least temporarily stored in a storage medium, such as the manufacturer's server, a server of the application store, or a relay server.

According to various embodiments of the disclosure, each component (e.g., a module or program) may be configured of a single or multiple entities, and the various embodiments may exclude some of the above-described sub components or add other sub components. Alternatively or additionally, some components (e.g., modules or programs) may be integrated into a single entity that may then perform the respective (pre-integration) functions of the components in the same or similar manner According to various embodiments of the disclosure, operations performed by modules, programs, or other components may be carried out sequentially, in parallel, repeatedly, or heuristically, or at least some operations may be performed in a different order or omitted, or other operations may be added.

Figure 2:
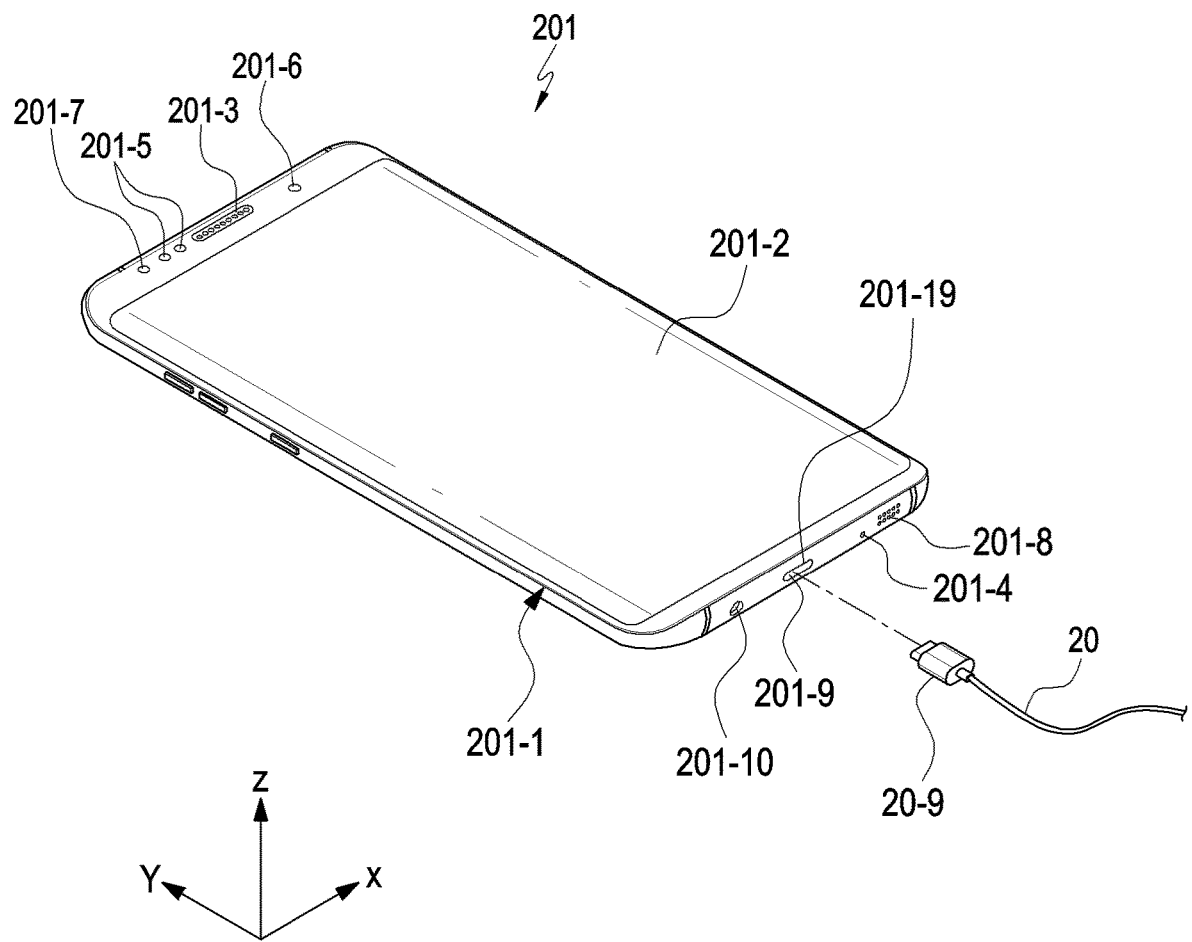
FIG. 2 is a perspective view illustrating an electronic device according to an embodiment of the disclosure.

FIG. 2 is a perspective view illustrating an electronic device according to an embodiment of the disclosure.

In the three-axis rectangular coordinate system as shown in FIG. 2, 'X,' 'Y,' and 'Z,' respectively, may denote the width, length, and height direction of the electronic device 201 (e.g., the electronic device 101 of FIG. 1).

The electronic device 201 may include a housing 201-1. According to an embodiment of the disclosure, the housing 202-1 may be formed of a conductive and/or non-conductive member. According to an embodiment of the disclosure, the electronic device 201 may include a touchscreen display 201-2 (e.g., the display device 160 of FIG. 1) disposed to be exposed in at least part of the housing 201-1. According to an embodiment of the disclosure, the touchscreen display 201-2 may operate as a pressure-responsive touchscreen display including a pressure sensor. According to an embodiment of the disclosure, the electronic device 201 may include a receiver 201-3 (e.g., the sound output device 155 of FIG. 1) disposed in the housing 201-1 to output the opposite party's voice. According to an embodiment of the disclosure, the electronic device 201 may include a microphone device 201-4 (e.g., the input device 150 of FIG. 1) disposed inside the housing 201-1 to transmit the user's voice to the opposite party. According to an embodiment of the disclosure, the electronic device 201 may include components that are disposed to be exposed in the touchscreen display 201-2 or to perform functions through the window without being exposed to perform various functions of the electronic device 201. According to an embodiment of the disclosure, the components may include at least one sensor module 201-5 (e.g., the sensor module 176 of FIG. 1). The sensor module 201-5 may include, e.g., an illuminance sensor (e.g., an optical sensor), a proximity sensor (e.g., an optical sensor), an infrared (IR) sensor, an ultrasonic sensor, a fingerprint recognition sensor, or an iris recognition sensor. According to an embodiment of the disclosure, the components may include a camera device 201-6 (e.g., the camera module 180 of FIG. 1). According to an embodiment of the disclosure, the components may include an indicator 201-7 (e.g., a light emitting diode (LED) device) to visually provide state information about the electronic device to the user. According to an embodiment of the disclosure, at least one of the components may be disposed to be exposed through at least part of the housing 201-1.

According to an embodiment of the disclosure, the electronic device 201 may include a speaker device 201-8 (e.g., the sound output device 155 of FIG. 1) disposed on a side of the microphone device 201-4. According to an embodiment of the disclosure, the electronic device may include an earphone jack 201-10 and a connector 201-9 (e.g., the connecting terminal 178 of FIG. 1) disposed on the opposite side of the microphone device 201-4 to enable connection to an external device. According to an embodiment of the disclosure, the connector 201-9 may be a socket-type connector.

According to an embodiment of the disclosure, an opening 201-19 may be formed in at least part of the housing 201-1 to expose the connector 201-9, and the connector 201-9 may be disposed in the opening 201-19. According to an embodiment of the disclosure, a header-type external connector 20-9 may be coupled to the connector 201-9 in a forward or backward direction. According to an embodiment of the disclosure, the external connector 20-9 may be connected to an external device. As the connector 201-9 couples to the external connector 20-9, the electronic device 201 may connect to the external device 20 (e.g., the electronic device 102 of FIG. 1). According to an embodiment of the disclosure, the external device 20 may be various external devices that may connect to the electronic device 201. For example, the external device 20 may include an audio device, a computer, a charger, a memory, an electric fan, or an antenna (e.g., a digital multi-media broadcast antenna or frequency modulation (FM) antenna).

Figure 3A:
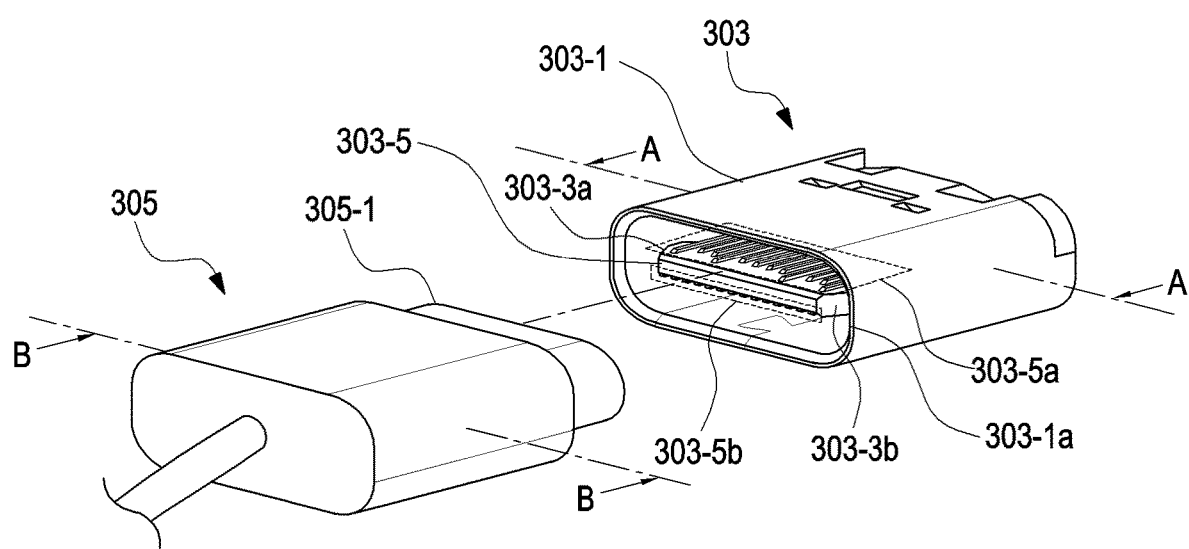
FIG. 3A is a perspective view illustrating a connector of an electronic device and an external connector according to an embodiment of the disclosure.

FIG. 3A is a perspective view illustrating a connector of an electronic device and an external connector according to an embodiment of the disclosure.

Referring to FIG. 3A, according to an embodiment of the disclosure, a connector 303 (e.g., 201-9 of FIG. 2) may be socket-type and may have a housing 303-1 that forms the outer surface of the connector 303 and has an opening 303-1 formed in at least a portion of the outer surface to allow the connector 303 to be coupled with a header 305-1 of external connector 305 (e.g., the external connector 20-9 of FIG. 2) in a forward or reverse direction. According to an embodiment of the disclosure, the connector 303 may include a board 303-5 inside the opening 303-1a. The board 303-5 may include a first surface 303-5a on which a plurality of first pins are arranged corresponding to the forward direction and a second surface 303-5b on which a plurality of second pins are arranged corresponding to the reverse direction.

According to an embodiment of the disclosure, the connector 303 may further include a first latch pin 303-3a and a second latch pin 303-3b that allow for physical or electrical connection with the external connector 305. According to an embodiment of the disclosure, the first and second latch pins 303-3a and 303-3b may at least partially include a fastening groove to which the external connector 305 may be fastened. According to an embodiment of the disclosure, the first latch pin 303-3a may correspond to the forward direction, and the second latch pin 303-3b may correspond to the reverse direction. At least one of the first latch pin 303-3a or the second latch pin 303-3b may selectively connect with a wireless communication circuit.

Figure 3B:
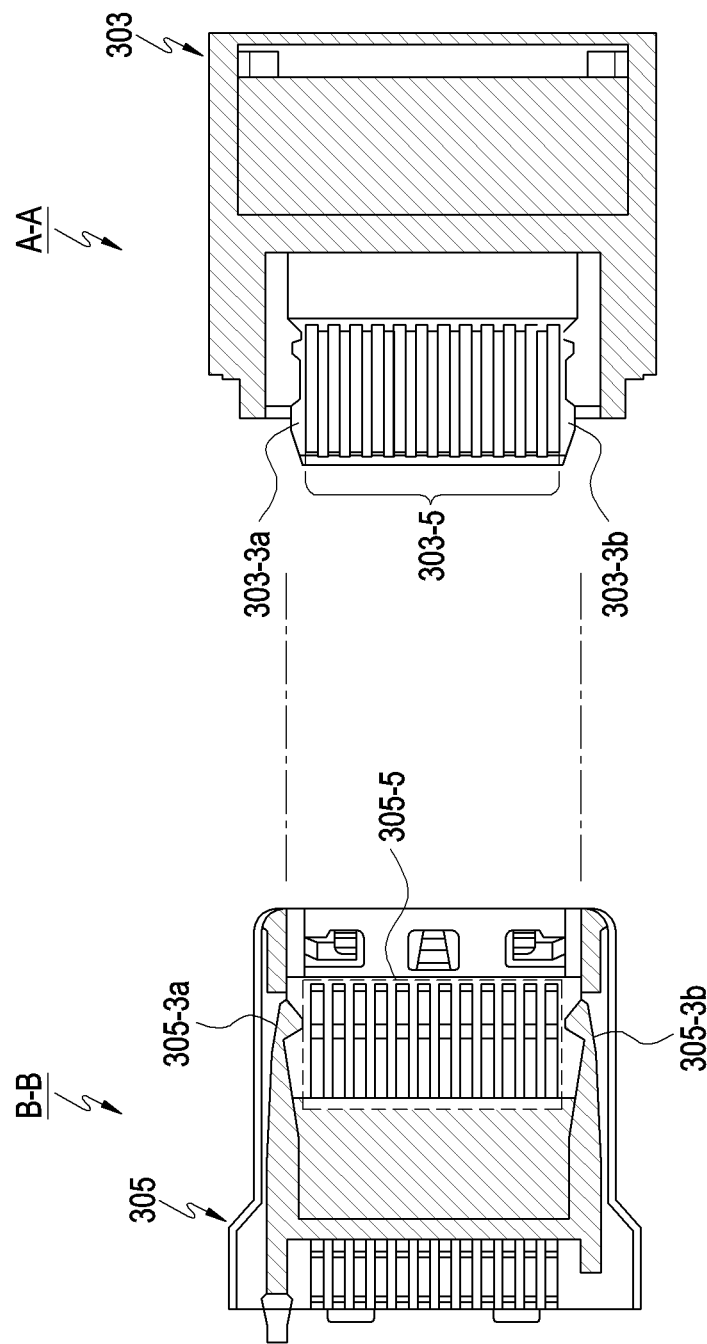
FIG. 3B is a cross-sectional view illustrating a connector of an electronic device and an external connector according to an embodiment of the disclosure.

FIG. 3B is a cross-sectional view illustrating a connector of an electronic device and an external connector according to an embodiment of the disclosure.

Referring to FIG. 3B, according to an embodiment of the disclosure, an external connector 305 (e.g., the external connector 20-9 of FIG. 2) may include an external board 305-5 with at least one or more pins that may partially couple with the plurality of pins of the board 303-5 of the connector 303. For example, the external board 305-5 may include at least one or more pins that may couple with at least some of a plurality of first pins of the board 303-5 of the connector 303 and a plurality of second pins of the board 303-5 of the connector 303.

According to an embodiment of the disclosure, the external connector 305 may further include a first hook 305-3a and a second hook 305-3b that allow for physical or electrical connection with the connector 303. According to an embodiment of the disclosure, at least part of the first hook and second hook 305-3a and 305-3b may be fastened to a fastening hole of the connector 303. According to an embodiment of the disclosure, the first hook 305-3a may correspond to the forward direction, and the second hook 305-3b may correspond to the reverse direction. At least one of the first hook 305-3a or the second hook 305-3b may selectively be connected with a wireless communication circuit via at least one of the first latch pin 303-3a or the second latch pin 303-3b.

According to an embodiment of the disclosure, an electronic device (e.g., the electronic device 101 of FIG. 1 or the electronic device 201 of FIG. 2) may comprise a wireless communication circuit (e.g., the communication module 190 of FIG. 1) configured to receive wireless communication data and a universal serial bus (USB) type-C connector (e.g., the connecting terminal 178 of FIG. 1), wherein the connector may include a housing (e.g., the housing 303-1 of FIG. 3A) forming an outer surface of the connector and having an opening (e.g., the opening 303-1a of FIG. 3a) formed in at least a portion of the outer surface and allowing a header-type external connector (e.g., the external connector 20-9 of FIG. 2) to be coupled to the connector in a forward direction or a reverse direction and a board (e.g., the board 303-5 of FIG. 3A) disposed inside the opening and having a first surface on which a plurality of first pins corresponding to the forward direction are arranged and a second surface on which a plurality of second pins corresponding to the reverse direction are arranged, wherein the plurality of first pins may include one or more first ground pins and one or more first signal pins, and the plurality of second pins include one or more second ground pins and one or more second signal pins, and the one or more first signal pins may include at least one first signal pin selectively connectable with the wireless communication circuit (e.g., the communication module 190 of FIG. 1) and a designated function circuit (e.g., the audio module 170 of FIG. 1), and the one or more second signal pins include at least one second signal pin corresponding to the reverse direction of the at least one first signal pin and selectively connectable with the designated function circuit and the wireless communication circuit.

According to an embodiment of the disclosure, the electronic device may further comprise at least one processor electrically connected with the connector and the wireless communication circuit. The at least one processor may be configured to selectively connect the at least one first signal pin or the at least one second signal pin to a corresponding one of the designated function circuit and the wireless communication circuit.

According to an embodiment of the disclosure, an electronic device including the external connector may include an antenna (e.g., the antenna module 197 of FIG. 1) configured to receive the wireless communication data.

According to an embodiment of the disclosure, an external device including the external connector may include an antenna configured to receive wireless broadcast data.

According to an embodiment of the disclosure, an external device including the external connector may include an antenna configured to receive DMB data or FM broadcast data.

According to an embodiment of the disclosure, the connector may be a USB type-C socket, and the external connector may be a USB type-C header.

According to an embodiment of the disclosure, the electronic device may further comprise a voltage detecting circuit (e.g., the interface 177 of FIG. 1 or an integrated circuit (IC)) configured to detect a voltage supplied to at least one of the one or more first signal pins and the one or more second signal pins. The at least one processor may be configured to selectively connect the at least one first signal pin or the at least one second signal pin to a corresponding one of the designated function circuit and the wireless communication circuit, based on the voltage detected by the voltage detecting circuit.

According to an embodiment of the disclosure, an electronic device may comprise a wireless communication circuit configured to receive wireless communication data and a USB type-C connector, wherein the connector may include a housing forming an outer surface of the connector and having an opening formed in at least a portion of the outer surface to allow a header-type external connector to be coupled to the connector in a forward direction or a reverse direction and a board disposed inside the opening and having a first surface on which a plurality of first pins corresponding to the forward direction are arranged and a second surface on which a plurality of second pins corresponding to the reverse direction are arranged, wherein the plurality of first pins may include one or more first ground pins and one or more first signal pins, and the plurality of second pins may include one or more second ground pins and one or more second signal pins, and the one or more first ground pins may include at least one first ground pin selectively connectable with a ground and the wireless communication circuit, and the one or more second ground pins may include at least one second ground pin corresponding to the reverse direction of the at least one first ground pin and selectively connectable with the ground and the wireless communication circuit.

According to an embodiment of the disclosure, the electronic device may further comprise at least one processor electrically connected with the connector and the wireless communication circuit. The at least one processor may be configured to selectively connect the at least one first ground pin or the at least one second ground pin to a corresponding one of the ground and the wireless communication circuit.

According to an embodiment of the disclosure, where the first ground pin and the second ground pin each connect to the external connector and the wireless communication circuit, a signal corresponding to wireless communication data received by an external antenna connected with the external connector may be delivered to the wireless communication circuit via each of the first ground pin and the second ground pin. According to an embodiment of the disclosure, the first ground pin and the second ground pin each may receive a signal corresponding to different wireless communication data. According to an embodiment of the disclosure, the first ground pin and the second ground pin may simultaneously connect to the external antenna via the external connector. Where the first ground pin and the second ground pin simultaneously connect to the external antenna, the first ground pin and the external antenna may function as a first antenna, and the second ground pin and the external antenna may function as a second antenna, thereby configuring a diversity antenna.

According to an embodiment of the disclosure, an electronic device may comprise a wireless communication circuit configured to receive wireless communication data and a USB type-C connector, wherein the connector may include a housing forming an outer surface of the connector and having an opening formed in at least a portion of the outer surface to allow a header-type external connector to be coupled to the connector in a forward direction or a reverse direction, a board disposed inside the opening and having a first surface on which a plurality of first pins corresponding to the forward direction are arranged and a second surface on which a plurality of second pins corresponding to the reverse direction are arranged, and a first latch pin (e.g., the first latch pin 303-3a of FIG. 3A or 3B) disposed on a first side of the board, configured to allow for electrical connection with the external connector, and corresponding to the forward direction and a second latch pin (e.g., the second latch pin 303-3b of FIG. 3A or 3B) disposed on a second side of the board, configured to allow for electrical connection with the external connector, and corresponding to the reverse direction, wherein the plurality of first pins include one or more first ground pins and one or more first signal pins, and the plurality of second pins include one or more second ground pins and one or more second signal pins, and wherein at least one of the first latch pin or the second latch pin is selectively connected with the wireless communication circuit.

According to an embodiment of the disclosure, the electronic device may further comprise at least one processor electrically connected with the connector and the wireless communication circuit. The at least one processor may be configured to selectively connect at least one of the first latch pin or the second latch pin to the wireless communication circuit.

According to an embodiment of the disclosure, where the first latch pin and the second latch pin each connect to the external connector and the wireless communication circuit, a signal corresponding to wireless communication data received by an external antenna connected with the external connector may be delivered to the wireless communication circuit via each of the first latch pin and the second latch pin. According to an embodiment of the disclosure, the first latch pin and the second latch pin each may receive a signal corresponding to different wireless communication data. According to an embodiment of the disclosure, the first latch pin and the second latch pin may simultaneously connect to the external antenna via the external connector. Where the first latch pin and the second latch pin simultaneously connect to the external antenna, the first latch pin and the external antenna may function as a first antenna, and the second latch pin and the external antenna may function as a second antenna, thereby configuring a diversity antenna.

Figure 4:
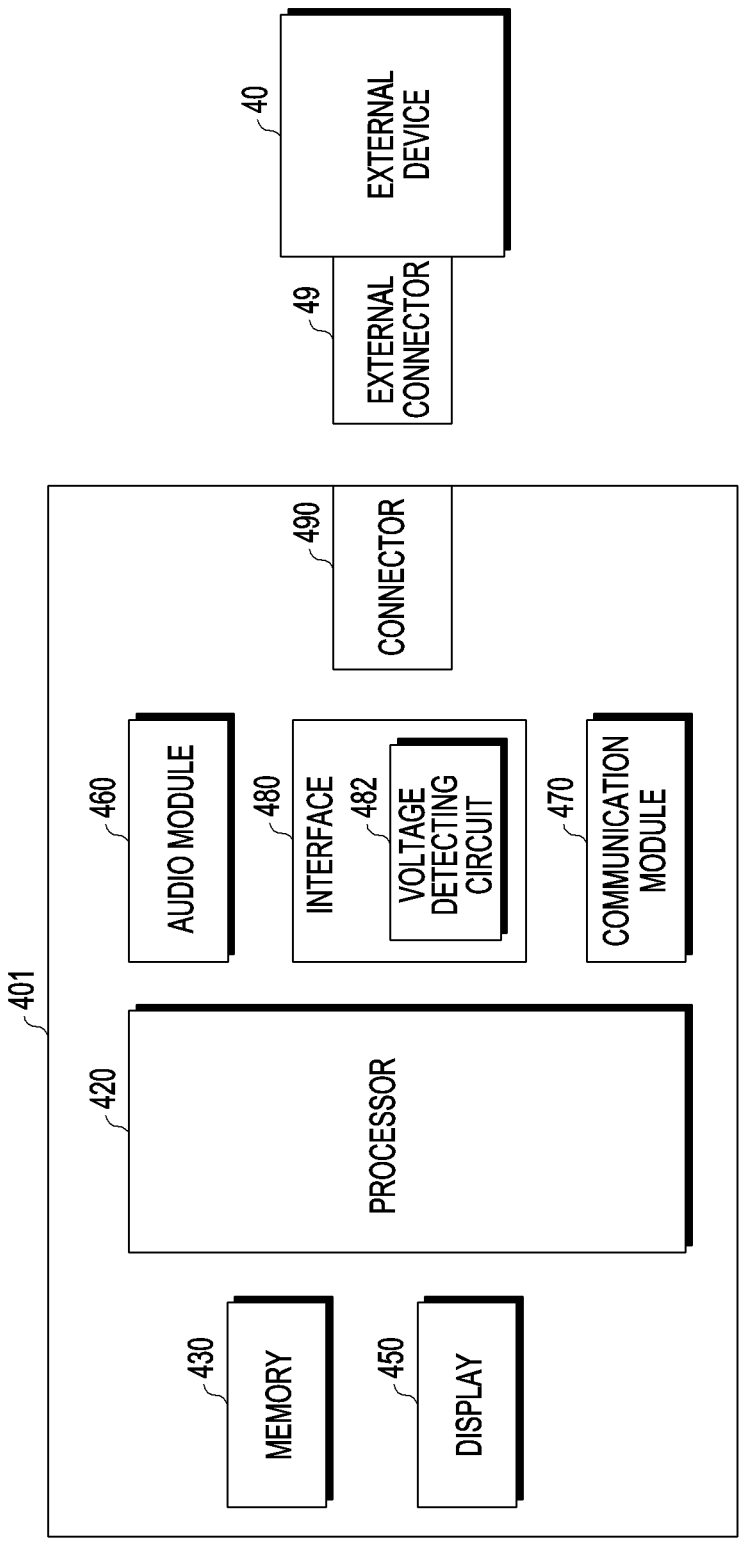
FIG. 4 is a block diagram illustrating an electronic device with an antenna-connectable connector according to an embodiment of the disclosure.

FIG. 4 is a block diagram illustrating an electronic device with an antenna-connectable connector according to an embodiment of the embodiment.

Referring to FIG. 4, an electronic device 401 (e.g., the electronic device 101 of FIG. 1 or the electronic device 201 of FIG. 2) may include a processor 420, a memory 430, a display 450, an audio module 460, a communication module 470, an interface 480, and a connector 490.

The processor 420 (e.g., the processor 120 of FIG. 1) may control the overall operation of the electronic device 401. The processor 420 may include one or more of a central processing unit (CPU), an application processor (AP), or a communication processor (CP). The processor 420 may perform control on at least one of the other components of the electronic device 401 or perform an operation or data processing relating to communication.

According to an embodiment of the disclosure, the processor 420 may recognize connection of an external device 40 (e.g., the electronic device 102 of FIG. 1 or the external device 20 of FIG. 2) as it connects to an external connector 49 (e.g., the external connector 20-9 of FIG. 2 or the external connector 305 of FIGS. 3A and 3B) via the connector 490 (e.g., the connector 201-9 of FIG. 2 or the connector 303 of FIGS. 3A and 3B). According to an embodiment of the disclosure, the processor 420 may recognize the connection of the external device 40 via at least one, e.g., a configuration channel (CC) pin, among a plurality of signal pins included in the connector 490. The processor 420 may determine a circuit to be connected with at least one of one or more first signal pins, which are provided in the forward direction, of the connector 409 or at least one of one or more second signal pins, which are provided in the reverse direction, of the connector 490, based on a result of recognizing the external device 40. The circuit to connect may be a particular module, a processor, or a ground.

According to an embodiment of the disclosure, the processor 420 may select one of a circuit with a designated function (e.g., the audio module 460) or a wireless communication circuit (e.g., the communication module 470), as the circuit to be connected to at least one signal pin or at least one second signal pin of the connector 490. The processor 420 may perform control to connect the at least one first signal pin or at least one second signal pin of the connector 490 to the circuit with the designated function or the wireless communication circuit depending on the selection. For example, the processor 420 may perform control to connect the at least one first signal pin or at least one second signal pin of the connector 490 to one of the audio module 460 or the communication module 470. According to an embodiment of the disclosure, where the at least one first signal pin or at least one second signal pin connects to the audio module 460, audio signals input from the microphone of the external device 40 via the at least one first signal pin or the at least one second signal pin may be delivered to the audio module 460. According to an embodiment of the disclosure, where the at least one first signal pin or at least one second signal pin connects to the communication module 470, broadcast data signals received through the antenna of the external device 40 may be transferred to the communication module 470. According to an embodiment of the disclosure, the broadcast data signals may include digital multimedia broadcasting (DMB) data signals or frequency modulation (FM) broadcast data signals.

According to an embodiment of the disclosure, the processor 420 may determine a circuit to be connected with at least one of one or more first ground pins of the connector 490 or at least one of one or more second ground pins of the connector 490. The circuit to be connected with the at least one first ground pin or the at least one second ground pin may be a particular module, a processor, or a ground.

According to an embodiment of the disclosure, the processor 420 may determine whether to connect the at least one first ground pin or at least one second ground pin of the connector 490 to the ground or the communication module 470. The processor 420 may perform control to connect the at least one first ground pin or at least one second ground pin of the connector 490 to one of the ground or the communication module 470.

According to an embodiment of the disclosure, the processor 420 may determine a signal to be connected with at least one or more latch pins of the connector 490. According to an embodiment of the disclosure, the processor 420 may determine whether to connect the first latch pin or second latch pin of the connector 490 to the communication module 470. The processor 420 may perform control to connect the first latch pin or second latch pin of the connector 490 to the communication module 470.

The memory 430 (e.g., the memory 130) may include a volatile and/or non-volatile memory. For example, the memory 430 may store commands or data related to at least one other component of, e.g., the electronic device 401. According to an embodiment of the disclosure, the memory 430 may store software and/or a program. According to an embodiment of the disclosure, the memory 430 may store instructions to perform operations performed on the processor 420.

The display 450 (e.g., the display device 160) may visually provide information related to identification and recognition of connection with the external device 40 to the user of the display 450. Upon performing a designated function according to connection with the external device 40, the display 450 may display information related to performing the designated function. Upon receiving broadcast data according to connection with the external device 40, the display 450 may display information about the received broadcast data.

The audio module 460 (e.g., the audio module 170) may convert sounds into electrical signals and vice versa. According to an embodiment of the disclosure, the audio module 460 may connect any one of at least one first signal pin, at least one second signal pin, at least one first ground pin, at least one second ground pin, the first latch pin or the second latch pin of the connector 490 and may receive audio signals from the external device 40 (e.g., a microphone) via the connected pin and process the audio signals.

The communication module 470 may include a wireless communication circuit capable of receiving wireless communication data signals. The wireless communication data signals may include broadcast data signals. For example, the broadcast data signals may include DMB data signals or FM data signals. According to an embodiment of the disclosure, the communication circuit capable of receiving wireless communication data may connect any one of at least one first signal pin, at least one second signal pin, at least one first ground pin, at least one second ground pin, the first latch pin or the second latch pin of the connector 490 and may receive wireless communication data signals via the external device 40 (e.g., an antenna) and through the connected pin and process the received wireless communication data signals. For example, the antenna may include, e.g., a DMB antenna, a terrestrial broadcast DMB antenna, or an FM antenna.

The interface 480 (e.g., the interface 177 of FIG. 1) may support a designated protocol for connecting with the external device 40 (e.g., the electronic device 102 of FIG. 1 or the external device 20 of FIG. 2). According to an embodiment of the disclosure, the interface 480 may include a universal serial bus (USB) interface and a voltage detecting circuit (e.g., an integrated circuit (IC)) 482 for processing the USB interface. According to an embodiment of the disclosure, the IC 482 may detect at least one, coupled with the pin of the external connector 49, among the plurality of pins of the connector 490 or detect a voltage applied to at least one pin, or the IC 482 may perform switching to connect the at least one pin, coupled with the pin of the external connector 49, among the plurality of pins, to its respective related circuit. According to an embodiment of the disclosure, the IC 482 may detect a voltage applied to the CC pin among the plurality of pins of the connector 490 and allows the external connector 49 (or the external device 40) connected with the connector 490 to be recognized or identified based on the detected voltage. For example, the IC 482 may include at least one of a micro-usb interface controller (MUIC), a cable and connector integrated chip (CCIC), or a power delivery integrated chip (PDIC).

The connector 490 (e.g., the connecting terminal 178 of FIG. 1, the connector 201-9 of FIG. 2, or the connector 303 of FIGS. 3A and 3B) may be electrically or physically coupled with the external connector 49 of the external device 40, allowing the electronic device 401 and the external device 40 to connect together. According to an embodiment of the disclosure, the connector 490 may include a USB connector including a plurality of pins. According to an embodiment of the disclosure, the connector 490 may be a USB type-C connector.

Figure 5A:
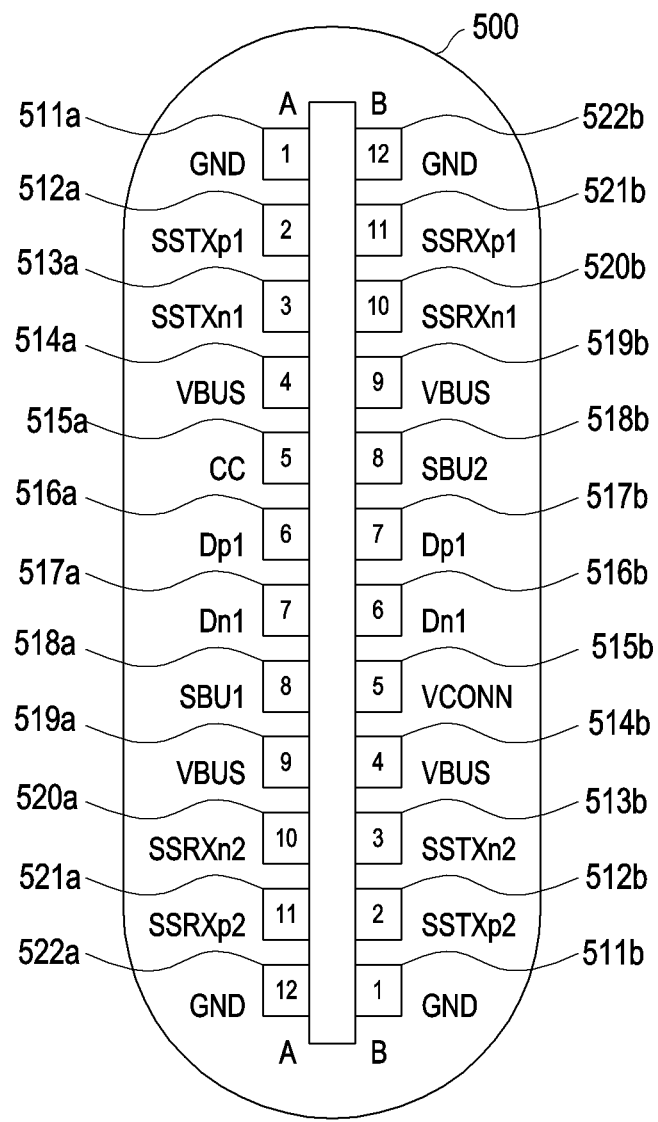

FIGS. 5A and 5B are views illustrating pins of a connector according to an embodiment of the disclosure.

Referring to FIG. 5A, according to an embodiment of the disclosure, a connector 500 (e.g., the connecting terminal 178 of FIG. 1, the connector 201-9 of FIG. 2, the connector 303 of FIGS. 3A and 3B, or the connector 490 of FIG. 4) may be a USB type-C connector. The connector 500 may include a plurality of pins. According to an embodiment of the disclosure, the connector 500 may include a plurality of first pins on a first surface (e.g., surface A) corresponding to the forward direction and a plurality of second pins on a second surface (e.g., surface B) corresponding to the reverse direction. For example, the plurality of first pins may include a GND pin 511*a*, an SSTXp1 pin 512*a*, an SSTXn1 pin 513*a*, a VBUS pin 514*a*, a CC pin 515*a*, a Dp1 pin 516*a*, a Dn1 pin 517*a*, an SBU1 pin 518*a*, a VBUS pin 519*a*, an SSRXn2 pin 520*a*, an SSRXp2 pin 521*a*, and a GND pin 522*a*. For example, the plurality of second pins may include a GND pin 511*b*, an SSTXp1 pin 512*b*, an SSTXn1 pin 513*b*, a VBUS pin 514*b*, a VCONN pin 515*b*, a Dp1 pin 516*b*, a Dn1 pin 517*b*, an SBU1 pin 518*b*, a VBUS pin 519*b*, an SSRXn2 pin 520*b*, an SSRXp2 pin 521*b*, and a GND pin 522*b*.

According to an embodiment of the disclosure, the plurality of first pins may include one or more first ground pins, e.g., GND pins 511*a* and 522*a*, and one or more first signal pins, e.g., the SSTXp1 pin 512*a*, SSTXn1 pin 513*a*, VBUS pin 514*a*, CC pin 515*a*, Dp1 pin 516*a*, Dn1 pin 517*a*, SBU1 pin 518*a*, VBUS pin 519*a*, SSRXn2 pin 520*a*, and SSRXp2 pin 521*a*, and the plurality of second pins may include one or more second ground pins, e.g., GND pins 511*b* and 522*b*, and one or more second signal pins, e.g., the SSTXp2 pin 512*b*, SSTXn2 pin 513*b*, VBUS pin 514*b*, VCONN pin 515*b*, Dp1 pin 516*b*, Dn1 pin 517*b*, SBU2 pin 518*b*, VBUS pin 519*b*, SSRXn1 pin 520*b*, and SSRXp1 pin 521*b*.

Referring to FIG. 5B, the SSTXp1 pin and SSTXp2 pin 512*a* and 512*b* and the SSTXn1 pin and SSTXn2 pin 513*a* and 513*b* may be pins for super speed transmission (TX) capable of quick data transmission. The VBUS pins 514*a* and 514*b* may be pins for USB cable charging. The CC pin 515*a* may be a pin serving as an identification terminal. The VCONN pin 515*b* may be a pin for supporting plugged power. The Dp1 pins 516*a* and 516*b* and the Dn1 pins 517*a* and 517*b* may be pins for bi-directional, different USB signals. The SBU1 pin and SBU2 pin 518*a* and 518*b* may be extra pins that may be used for various signals (e.g., audio signals or display signals). The SSRXn2 pin and SSRXn1 pin 520*a* and 520*b* and the SSRXp2 pin and SSRXp1 pin 521*a* and 521*b* may be pins for super speed reception (RX) capable of quick data reception.

According to an embodiment of the disclosure, at least one of one or more first signal pins, e.g., the SSTXp1 pin 512*a*, the SSTXn1 pin 513*a*, the VBUS pin 514*a*, the CC pin 515*a*, the Dp1 pin 516*a*, the Dn1 pin 517*a*, the SBU1 pin 518*a*, the VBUS pin 519*a*, the SSRXn2 pin 520*a*, or the SSRXp2 pin 521*a*, may selectively be connected with a designated function circuit (e.g., the audio module 460) and a wireless communication circuit (e.g., the communication module 470) capable of receiving wireless communication data (e.g., broadcast data), and at least one of one or more second signal pins, e.g., the SSTXp2 pin 512*b*, the SSTXn2 pin 513*b*, the VBUS pin 514*b*, the VCONN pin 515*b*, the Dp1 pin 516*b*, the Dn1 pin 517*b*, the VBUS pin 519*b*, the SSRXn1 pin 520*b*, or the SSRXp1 pin 521*b*, may selectively be connected with a designated function circuit (e.g., the audio module 460) or a circuit (e.g., the communication module 470) capable of receiving wireless communication data (e.g., broadcast data).

According to an embodiment of the disclosure, at least one of one or more first ground pins, e.g., the GND pins 511*a* and 522*a*, may selectively be connected with the communication module 470 capable of receiving wireless communication data (e.g., broadcast data), and at least one of one or more second ground pins, e.g., the GND pins 511*b* and 522*b*, may selectively be connected with the communication module 470 capable of receiving wireless communication data (e.g., broadcast data).

According to an embodiment of the disclosure, both the first GND pin 511*a* or 522*a* and the second GND pin 511*b* or 522*b* may connect to the communication module 470 capable of receiving wireless communication data (e.g., broadcast data). For example, where both the first GND pin 511*a* or 522*a* and the second GND pin 511*b* or 522*b* connect to the external connector and the wireless communication circuit, a signal corresponding to wireless communication data received by an external antenna connected with the external connector may be delivered to the wireless communication circuit via each of the first GND pin 511a or 522a and the second GND pin 511b or 522b. According to an embodiment of the disclosure, the first GND pin 511a or 522a and the second GND pin 511b or 522b each may receive a signal corresponding to different wireless communication data. According to an embodiment of the disclosure, the first GND pin 511a or 522a and the second GND pin 511b or 522b may simultaneously connect to the external antenna via the external connector. Where the first GND pin 511a or 522a and the second GND pin 511b or 522b simultaneously connect to the external antenna, the first GND pin 511a or 522a and the external antenna may function as a first antenna, and the second GND pin 511b or 522b and the external antenna may function as a second antenna, thereby configuring a diversity antenna.

In the above-described embodiments of the disclosure, although the first signal pin and second signal pin and the first ground pin and second ground pin are used as pins selectively connectable with the communication module 470, at least part of the latch structure may be designated as a latch pin selectively connectable with the communication module 470, and the latch pin may selectively be connected with the communication module 470.

Figure 6A:
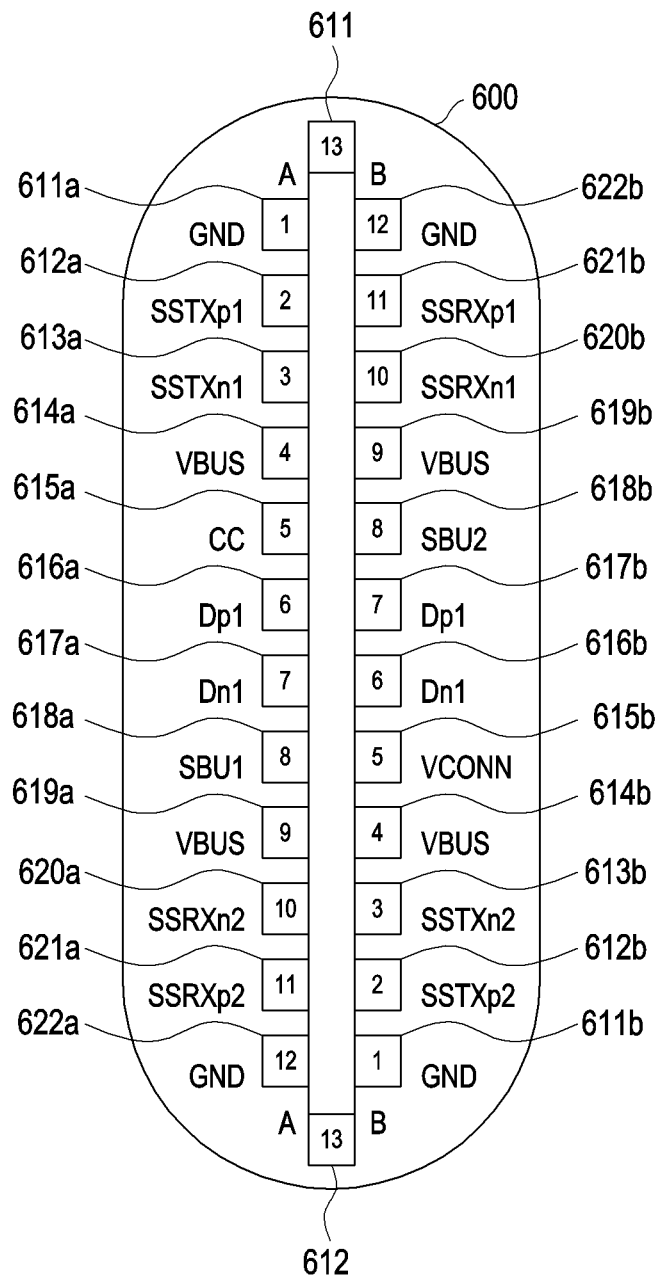

FIGS. 6A and 6B are views illustrating a connector with a latch pin according to an embodiment of the disclosure.

Referring to FIG. 6A, according to an embodiment of the disclosure, a connector 600 (e.g., the connecting terminal 178 of FIG. 1, the connector 201-9 of FIG. 2, the connector 303 of FIGS. 3A and 3B, or the connector 490 of FIG. 4) may be a USB type-C connector. The connector 600 may include a first latch pin 611 and a second latch pin 612 in addition to the plurality of first pins 611a to 622a and the plurality of second pins 611b to 622b.

According to an embodiment of the disclosure, the first latch pin 611 and the second latch pin 612 each may be at least part of the latch structure formed for an electrical or physical coupling with an external connector (e.g., the external connector 305 of FIGS. 3A and 3B or the external connector 49 of FIG. 4).

For example, the first latch pin 611 and the second latch pin 612 each may selectively be connected with a wireless communication circuit (e.g., the communication module 470) when the connector 600 and the external connector (e.g., the external connector 305 of FIGS. 3A and 3B or the external connector 49 of FIG. 4) are coupled together.

According to an embodiment of the disclosure, both the first latch pin 611 and the second latch pin 612 may connect to the communication module 470 capable of receiving wireless communication data (e.g., broadcast data). For example, where both the first latch pin 611 and the second latch pin 612 connect to the external connector and the wireless communication circuit, a signal corresponding to wireless communication data received by an external antenna connected with the external connector may be delivered to the wireless communication circuit via each of the first latch pin 611 and the second latch pin 612. According to an embodiment of the disclosure, the first latch pin 611 and the second latch pin 612 each may receive a signal corresponding to different wireless communication data. According to an embodiment of the disclosure, the first latch pin 611 and the second latch pin 612 may simultaneously connect to the external antenna via the external connector. Where the first latch pin 611 and the second latch pin 612 simultaneously connect to the external antenna, the first latch pin 611 and the external antenna may function as a first antenna, and the second latch pin 612 and the external antenna may function as a second antenna, thereby configuring a diversity antenna.

Referring to FIG. 6B, there may further be designated the first latch pin 611 and the second latch pin 612 for the purpose of receiving wireless communication data (e.g., to serve as an antenna) in addition to the pins 612a, 612b, 613a and 613b for super speed TX capable of quick data transmission, the pins 614a and 614b for USB cable power charging, the pin 615a serving as an identification terminal, the pin 615b for supporting plugged power, the pins 616a, 616b, 617a, and 617b for different, bi-directional USB signals, the extra pins 618a and 618b which may be used for various signals (e.g., audio signals or display signals), or the pins 620a, 620b, 621a, and 621b for super speed RX capable of quick data reception. According to an embodiment of the disclosure, the wireless communication data signals may include broadcast data signals. For example, the broadcast data signals may include DMB data signals or FM data signals.

According to an embodiment of the disclosure, a method for connecting an electronic device (e.g., the electronic device 101 of FIG. 1, the electronic device 201 of FIG. 2, or the electronic device 401 of FIG. 4) via a connector (e.g., the connecting terminal 178 of FIG. 1, the connector 201-9 of FIG. 2, the connector 303 of FIGS. 3A and 3B, or the connector 490 of FIG. 4) may include determining whether a circuit to be connected with at least one first signal pin corresponding to a forward direction among a plurality of signal pins of the connector or at least one second signal pin corresponding to a reverse direction is a designated function circuit (e.g., the audio module 170 of FIG. 1 or the audio module 460 of FIG. 4) or a wireless communication circuit (e.g., the communication module 190 of FIG. 1 or the communication module 470 of FIG. 4) and performing control to selectively connect the at least one first signal pin to the designated function circuit and the wireless communication circuit or to selectively connect the at least one second signal pin to the designated function circuit and the wireless communication circuit.

Figure 7:
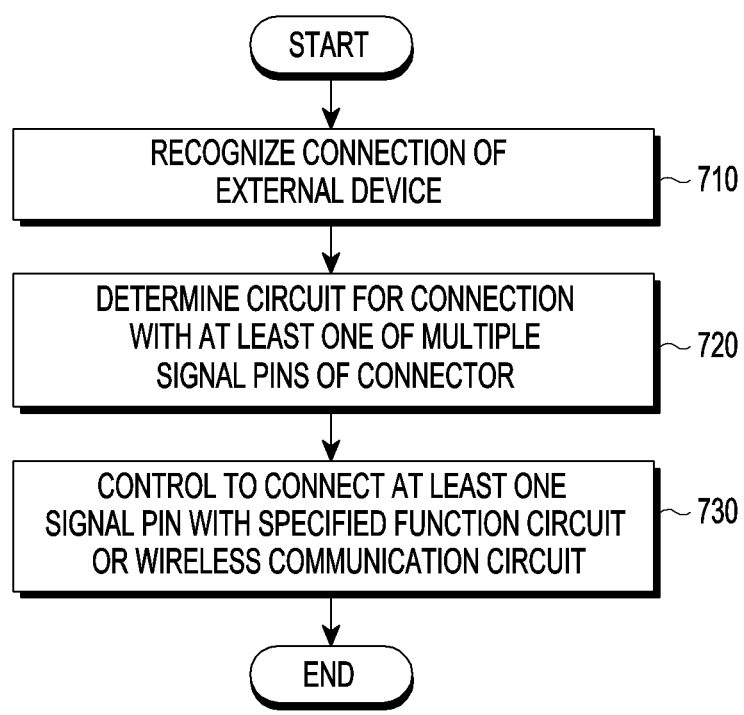
FIG. 7 is a view illustrating an operation for connecting at least one signal pin of a connector in an electronic device to a wireless communication circuit according to an embodiment of the disclosure.

FIG. 7 is a view illustrating the operation of connecting at least one signal pin of a connector in an electronic device to a wireless communication circuit according to an embodiment of the disclosure.

Referring to FIG. 7, an electronic device 401 (e.g., the electronic device 101 of FIG. 1) may recognize connection of an external device 40 (e.g., the electronic device 102 of FIG. 1 or the external device 20 of FIG. 2) in operation 710. According to an embodiment of the disclosure, the electronic device 401 may recognize the connection of the external device 40 and identify the external device 40 via the CC pin (e.g., 515a of FIGS. 5A and 5B or 615a of FIGS. 6A and 6B) among the one or more signal pins of the connector 490 (e.g., the connecting terminal 178 of FIG. 1, the connector 201-9 of FIG. 2, the connector 303 of FIGS. 3A and 3B, the connector 500 of FIG. 5A, or the connector 600 of FIG. 6A). For example, the electronic device 401 may detect the voltage applied to the CC pin via a voltage detecting integrated circuit (IC) (e.g., the IC 482 of FIG. 4) and may identify the connected external device 40 based on the level of the detected voltage.

The electronic device 401 may determine a circuit to be connected with at least one signal pin among the plurality of signal pins of the connector 490 in operation 720. According to an embodiment of the disclosure, the circuit to be connected with the at least one signal pin may be a particular module, a processor, or a ground.

According to an embodiment of the disclosure, the electronic device 401 may determine a circuit to be connected with at least one of one or more first signal pins (e.g., 512*a* to 521*a* of FIGS. 5A and 5B or 612*a* to 621*a* of FIGS. 6A and 6B) of the connector 490 or at least one of one or more second signal pins (e.g., 512*b* to 521*b* of FIGS. 5A and 5B or 612*b* to 621*b* of FIGS. 6A and 6B) of the connector 490, based on the level of the voltage applied to the CC pin.

The electronic device 401 may perform control to connect at least one signal pin with a designated function circuit or wireless communication circuit in operation 730. According to an embodiment of the disclosure, the electronic device 401 may determine whether the circuit to be connected with the at least one signal pin is the designated function circuit or the wireless communication circuit in operation 730. For example, the designated function circuit may include an audio module (e.g., the audio module 460 of FIG. 4).

For example, the wireless communication circuit may include a communication module (e.g., the communication module 470 of FIG. 4). According to an embodiment of the disclosure, the wireless communication data signals may include broadcast data signals. For example, the broadcast data signals may include DMB data signals or FM data signals.

Figure 8:
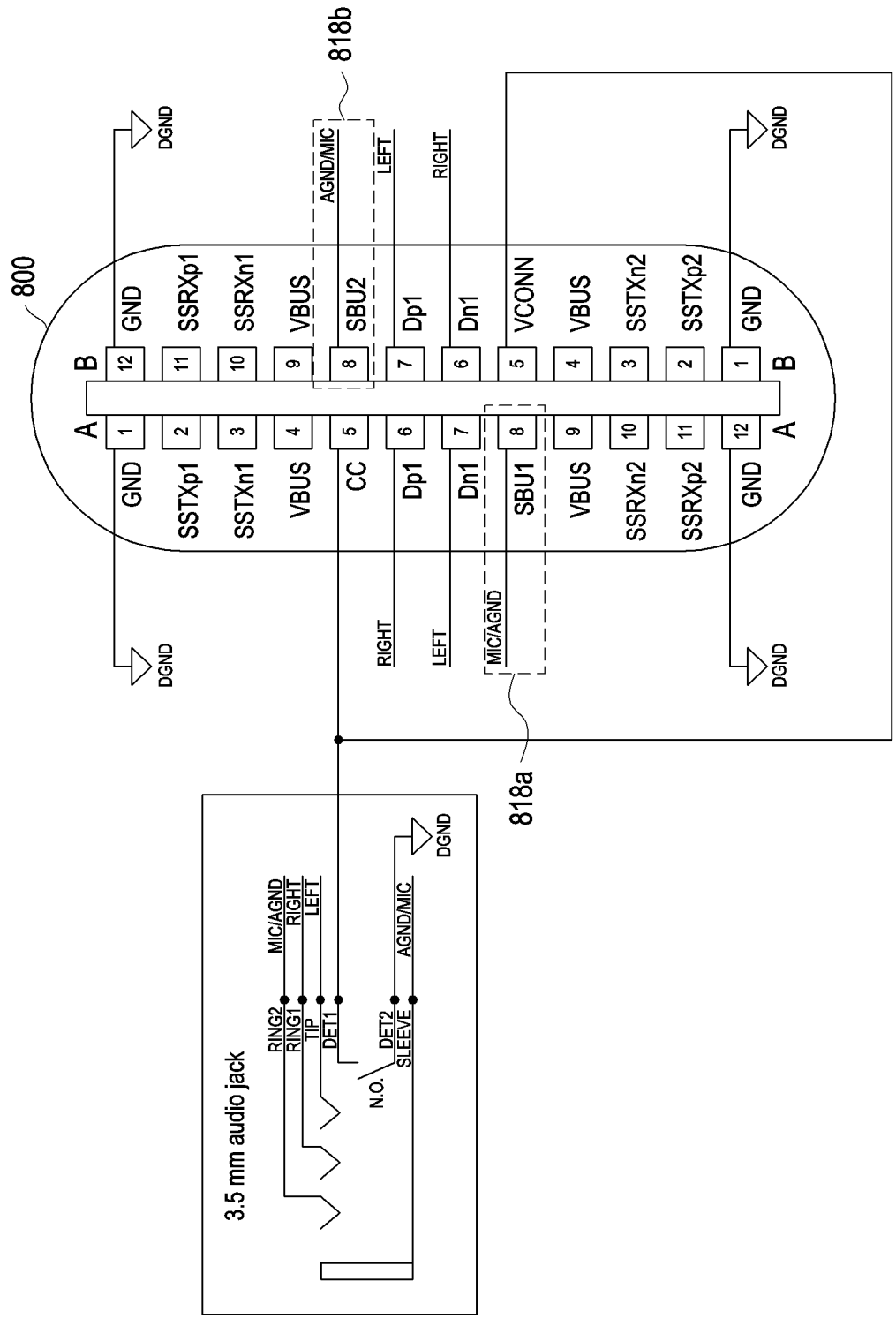
FIG. 8 illustrates at least one signal pin of a connector being connected with a designated function circuit or a wireless communication circuit according to an embodiment of the disclosure.

FIG. 8 illustrates at least one signal pin of a connector being connected with a designated function circuit or a wireless communication circuit according to an embodiment of the disclosure.

Referring to FIG. 8, the SBU1 pin 818*a* and SUB2 pin 818*b* of a connector 800 (e.g., the connecting terminal 178 of FIG. 1, the connector 201-9 of FIG. 2, the connector 303 of FIGS. 3A and 3B, the connector 490 of FIG. 4, the connector 500 of FIG. 5A, or the connector 600 of FIG. 6A) each may connect to a circuit with an audio input function (e.g., a circuit for receiving microphone signals) or a wireless communication circuit (e.g., a circuit for receiving broadcast data). According to an embodiment of the disclosure, the SBU1 pin 818*a* and the SBU2 pin 818*b* each may connect to the audio module 460 for receiving microphone signals or the communication module 470 for receiving wireless communication data signals. Upon connecting to the audio module 460, the SBU1 pin 818*a* and the SBU2 pin 818*b* each may receive microphone signals from an external device (e.g., a microphone) and deliver the signals to the audio module 460. Upon connecting to the communication module 470, the SBU1 pin 818*a* and the SBU2 pin 818*b* each may deliver wireless communication data signals received via an external device (e.g., an antenna) to the communication module 470. According to an embodiment of the disclosure, upon not connecting to either the circuit with an audio input function or to the wireless communication circuit, the SBU1 pin 818*a* and the SBU2 pin 818*b* each may connect to an analog ground.

According to an embodiment of the disclosure, a method for connecting an electronic device (e.g., the electronic device 101 of FIG. 1, the electronic device 201 of FIG. 2, or the electronic device 401 of FIG. 4) via a connector (e.g., the connecting terminal 178 of FIG. 1, the connector 201-9 of FIG. 2, the connector 303 of FIGS. 3A and 3B, or the connector 490 of FIG. 4) may include determining whether a circuit to be connected with at least one first ground pin corresponding to a forward direction among a plurality of signal pins of the connector or at least one second ground pin corresponding to a reverse direction is a wireless communication circuit and performing control to selectively connect the at least one first ground pin to a ground and the wireless communication circuit or to selectively connect the at least one second ground pin to the ground and the wireless communication circuit.

Figure 9:
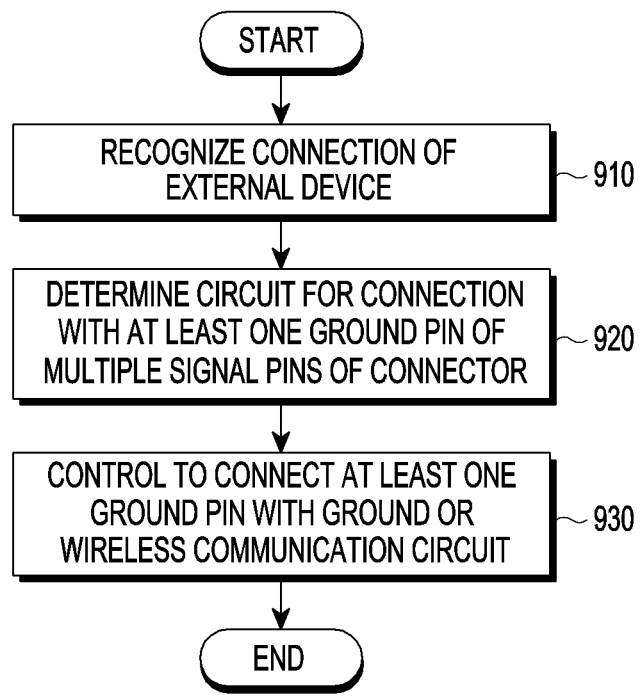
FIG. 9 is a view illustrating an operation of connecting at least one ground pin of a connector in an electronic device to a wireless communication circuit according to an embodiment of the disclosure.

FIG. 9 is a view illustrating an operation of connecting at least one ground pin of a connector in an electronic device to a wireless communication circuit according to an embodiment of the disclosure.

Referring to FIG. 9, an electronic device (e.g., the electronic device 101 of FIG. 1, the electronic device 201 of FIG. 2, or the electronic device 401 of FIG. 4) may recognize connection of an external device 40 (e.g., the electronic device 102 of FIG. 1 or the external device 20 of FIG. 2) in operation 910. According to an embodiment of the disclosure, the electronic device 401 may recognize the connection of the external device 40 and identify the external device 40 via the CC pin (e.g., 515*a* of FIGS. 5A and 5B or 615*a* of FIGS. 6A and 6B) among the one or more signal pins of the connector 490 (e.g., the connecting terminal 178 of FIG. 1, the connector 201-9 of FIG. 2, the connector 303 of FIGS. 3A and 3B, the connector 500 of FIG. 5A, or the connector 600 of FIG. 6A). For example, the electronic device 401 may detect the voltage applied to the CC pin via a voltage detecting integrated circuit (IC) (e.g., the IC 482 of FIG. 4) and may identify the connected external device 40 based on the level of the detected voltage.

The electronic device 401 may determine a circuit to be connected with at least one ground pin among the plurality of signal pins of the connector 490 in operation 920. According to an embodiment of the disclosure, the electronic device 401 may determine the circuit to be connected with at least one of one or more first ground pins (e.g., the ground pins 511*a* and 522*a* of FIGS. 5A and 5B) of the connector 490 or at least one of one or more second ground pins (e.g., 511*b* and 522*b* of FIGS. 5A and 5B) of the connector 490, based on the level of the voltage applied to the CC pin (e.g., 515*a* of FIGS. 5A and 5B or 615*a* of FIGS. 6A and 6B) detected by the IC 482. According to an embodiment of the disclosure, the circuit to be connected with the at least one ground pin may be a particular module, a processor, or a ground. According to an embodiment of the disclosure, the electronic device may determine whether the circuit to be connected with the at least one ground pin is a ground or a wireless communication circuit for receiving wireless communication data signals. According to an embodiment of the disclosure, the wireless communication data signals may include broadcast data signals. For example, the broadcast data signals may include DMB data signals or FM data signals.

In operation 930, the electronic device 401 may perform control to connect at least one ground pin to the ground or the wireless communication circuit (e.g., the communication module 470 of FIG. 4) based on the determination.

Figure 10:
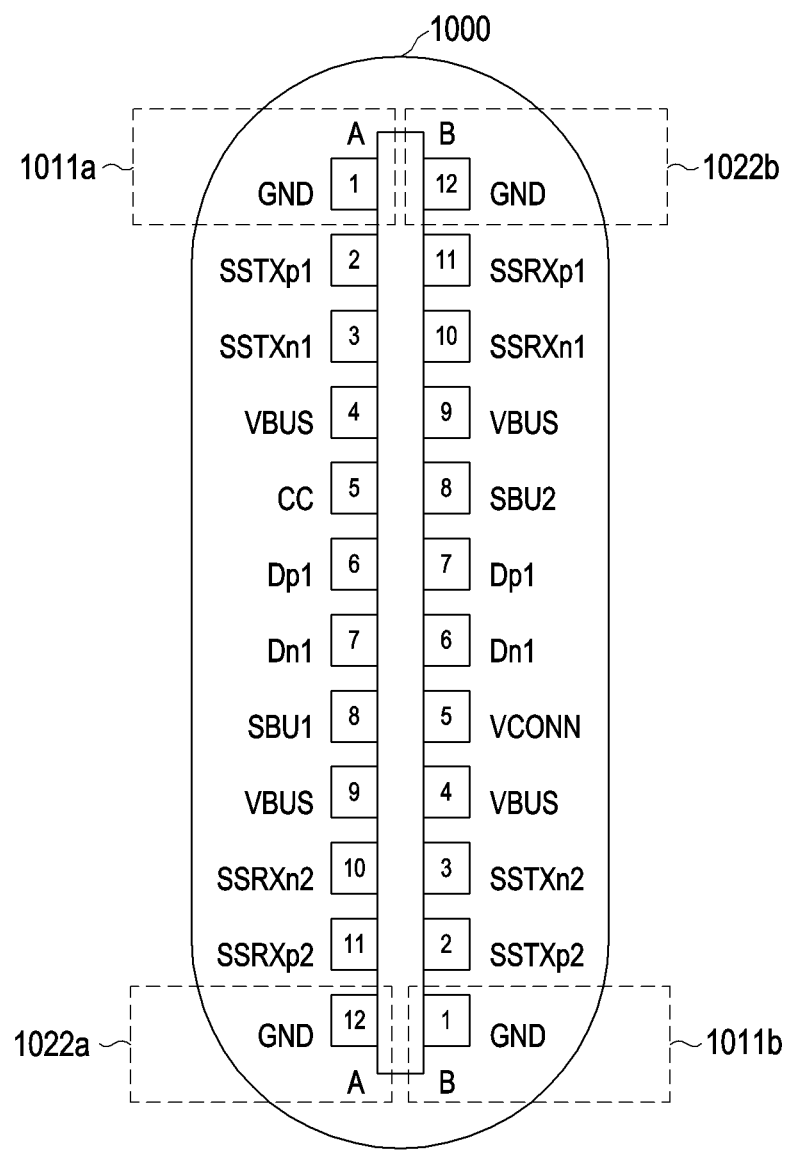
FIG. 10 illustrates at least one ground pin of a connector is connected with a wireless communication circuit according to an embodiment of the disclosure.

FIG. 10 illustrates at least one ground pin of a connector being connected with a wireless communication circuit according to an embodiment of the disclosure.

Referring to FIG. 10, at least one 1011*a* or 1022*a* of GND pins 1011*a*, 1022*a*, 1011*b*, and 1022*b* of a connector 1000 (e.g., the connecting terminal 178 of FIG. 1, the connector 201-9 of FIG. 2, the connector 303 of FIGS. 3A and 3B, the connector 490 of FIG. 4, the connector 500 of FIG. 5A, or the connector 600 of FIG. 6A) may selectively be connected with any one of a ground and a wireless communication circuit, or at least one second ground pin 1022*a* or 1022*b* may selectively be connected with any one of the ground and the wireless communication circuit.

The pin, connected with the wireless communication circuit, among the GND pins 1011*a*, 1022*a*, 1011*b*, and 1022b may deliver wireless communication data signals (e.g., broadcast data signals) received via an external device (e.g., an antenna) to the wireless communication circuit (e.g., the communication module 470).

According to an embodiment of the disclosure, a method for connecting an electronic device (e.g., the electronic device 101 of FIG. 1, the electronic device 201 of FIG. 2, or the electronic device 401 of FIG. 4) via a connector (e.g., the connecting terminal 178 of FIG. 1, the connector 201-9 of FIG. 2, the connector 303 of FIGS. 3A and 3B, or the connector 490 of FIG. 4) may include determining whether a circuit to be connected with at least one first latch pin corresponding to a forward direction among a plurality of signal pins of the connector or at least one second latch pin corresponding to a reverse direction is a wireless communication circuit (e.g., the communication module 190 of FIG. 1 or the communication module 470 of FIG. 4) and performing control to connect the at least one first latch pin to the wireless communication circuit or to connect the at least one second latch pin to the wireless communication circuit.

Figure 11:
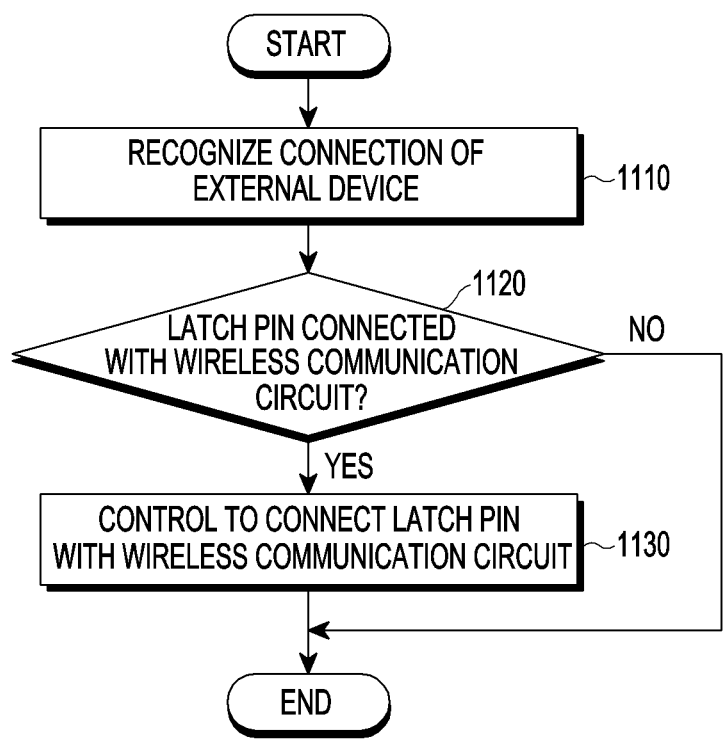
FIG. 11 is a view illustrating an operation for connecting a latch pin of a connector in an electronic device to a wireless communication circuit according to an embodiment of the disclosure.

FIG. 11 is a view illustrating an operation for connecting a latch pin of a connector in an electronic device to a wireless communication circuit according to an embodiment of the disclosure.

Referring to FIG. 11, an electronic device (e.g., the electronic device 101 of FIG. 1, the electronic device 201 of FIG. 2, or the electronic device 401 of FIG. 4) may recognize connection of an external device 40 (e.g., the electronic device 102 of FIG. 1 or the external device 20 of FIG. 2) in operation 1110. According to an embodiment of the disclosure, the electronic device 401 may recognize the connection of the external device 40 and identify the external device 40 via the CC pin (e.g., 515a of FIGS. 5A and 5B or 615a of FIGS. 6A and 6B) among the one or more signal pins of the connector 490 (e.g., the connecting terminal 178 of FIG. 1, the connector 201-9 of FIG. 2, the connector 303 of FIGS. 3A and 3B, the connector 500 of FIG. 5A, or the connector 600 of FIG. 6A). For example, the electronic device 401 may detect the voltage applied to the CC pin via a voltage detecting IC (e.g., the IC 482 of FIG. 4) connected with the CC pin and may identify the connected external device 40 based on the level of the detected voltage.

In operation 1120, the electronic device 401 may determine whether to connect a latch pin (e.g., the first latch pin 611 or second latch pin 612 of FIG. 6B) of the connector 490 to the wireless communication circuit. According to an embodiment of the disclosure, the electronic device 401 may determine whether to connect the first latch pin 611 or second latch pin 612 to the communication module 470 capable of receiving wireless communication data. According to an embodiment of the disclosure, the electronic device 401 may determine whether to connect the first latch pin 611 or second latch pin 612 to the communication module 470 based on the level of the voltage applied to the CC pin (e.g., 515a of FIGS. 5A and 5B or 615a of FIGS. 6A and 6B) detected by the IC 482. For example, when the voltage level is a pre-designated level, the electronic device 401 may determine to connect the first latch pin 611 or second latch pin 612 to the communication module 470 capable of receiving wireless communication data.

Upon determining to connect the first latch pin 611 or second latch pin 612 to the wireless communication circuit, the electronic device 401 may perform control to connect the first latch pin 611 or second latch pin 612 to the wireless communication circuit in operation 1130. For example, the electronic device 401 may perform control to connect the first latch pin 611 or second latch pin 612 to the communication module 470 capable of receiving wireless communication data. According to an embodiment of the disclosure, the wireless communication data signals may include broadcast data signals. For example, the broadcast data signals may include DMB data signals or FM data signals.

Figure 12:
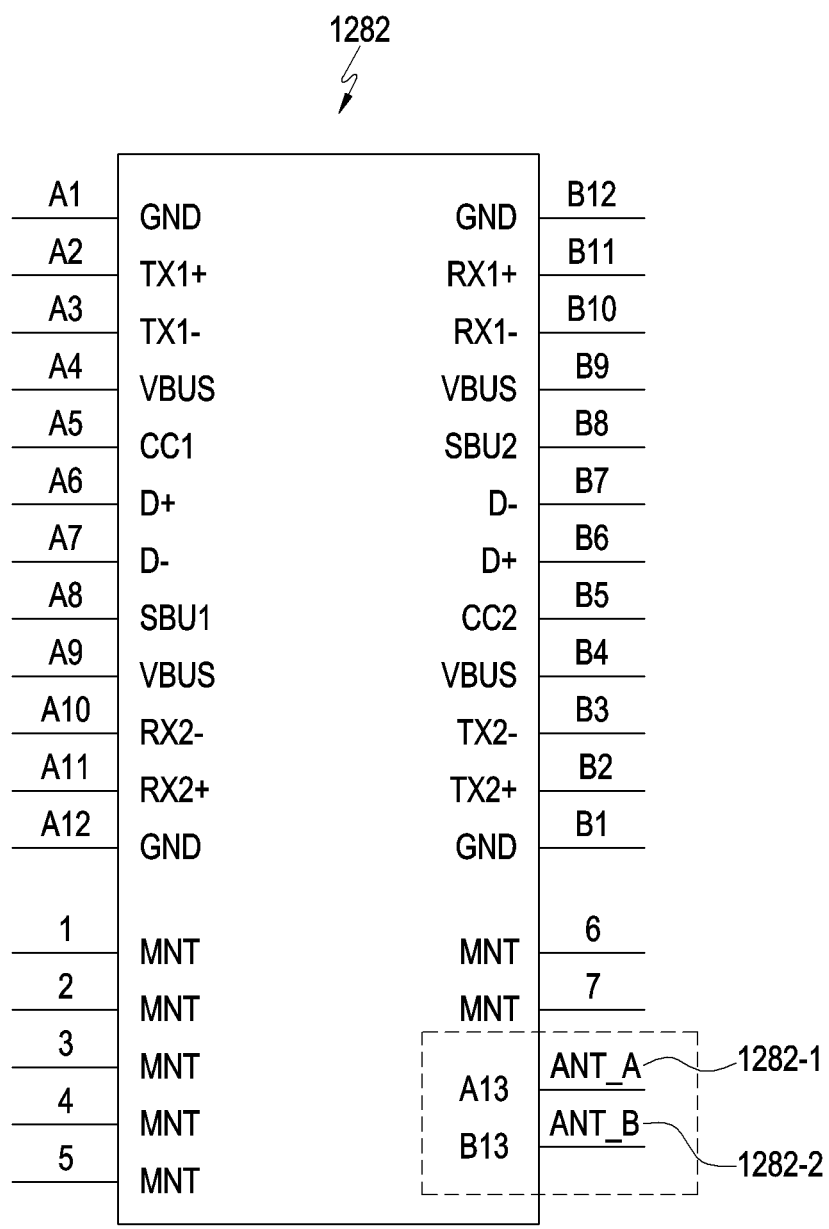
FIG. 12 illustrates an integrated circuit (IC) according to an embodiment of the disclosure.

FIG. 12 illustrates an IC according to an embodiment of the disclosure.

Referring to FIG. 12, according to an embodiment of the disclosure, an IC 1282 (e.g., the IC 482 of FIG. 4) may include a plurality of input terminals A1, A2, A3, A4, A6, A7, A8, A9, A10, A11, A12 and B1, B2, B3, B4, B6, B7, B8, B9, B10, B11, B12 each of which may be connected with a respective one of a plurality of pins (e.g., 511a to 522a and 511b to 522b of FIGS. 5A and 5B, or 611a to 622a and 611b to 622b of FIGS. 6A and 6B) of the connector 490, and the IC 1282 may further include extra input terminals 1, 2, 3, 4, 5, 6, and 7. According to an embodiment of the disclosure, the IC 1282 may further include input terminals A13 (1282-1) and B13 (1282-2) for an antenna, respectively corresponding to the first latch pin (e.g., 611 of FIGS. 6A and 6B) and the second latch pin (e.g., 612 of FIGS. 6A and 6B) of the connector 490.

According to an embodiment of the disclosure, the IC 1282 may detect at least one, coupled with the pin of the external connector 49, among the plurality of pins of the connector 490 or detect a voltage applied to at least one pin, or the IC 482 may perform switching to connect the at least one pin, coupled with the pin of the external connector 49, among the plurality of pins, to its respective related circuit. According to an embodiment of the disclosure, the IC 1282 may detect a voltage applied to the input terminal A5 corresponding to the CC1 pin among the plurality of pins of the connector 490 or the input terminal B5 corresponding to the CC2 pin and allows the external connector 49 (or the external device 40) connected with the connector 490 to be recognized or identified based on the detected voltage. For example, the IC 1282 may include at least one of an MUIC, a CCIC, or a PDIC.

Each of the aforementioned components of the electronic device may include one or more parts, and a name of the part may vary with a type of the electronic device. The electronic device in accordance with various embodiments of the disclosure may include at least one of the aforementioned components, omit some of them, or include other additional component(s). Some of the components may be combined into an entity, but the entity may perform the same functions as the components may do.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of application specific integrated circuit (ASIC) chips, field programmable gate arrays (FPGAs), or programmable logic arrays (PLAs) that perform some operations, which have already been known or will be developed in the future.

According to an embodiment of the disclosure, at least a part of the device (e.g., modules or their functions) or method (e.g., operations) may be implemented as instructions stored in a computer-readable storage medium e.g., in the form of a program module. The instructions, when performed by a processor (e.g., the processor 120), may enable the processor to carry out a corresponding function. The computer-readable storage medium may be e.g., the memory 130.

According to an embodiment of the disclosure, there may be provided a computer-readable recording medium storing a program, the program capable of performing operations on an electronic device including a wireless communication circuit configured to receive wireless communication data, a USB type-C connector, and at least one processor, the operations including determining whether a circuit to be connected with at least one first signal pin corresponding to a forward direction among a plurality of signal pins of the connector or at least one second signal pin corresponding to a reverse direction is a designated function circuit or the wireless communication circuit using the at least one processor and performing control to selectively connect the at least one first signal pin to the designated function circuit or the wireless communication circuit or to selectively connect the at least one second signal pin to the designated function circuit or the wireless communication circuit.

The computer-readable storage medium may include a hardware device, such as hard discs, floppy discs, and magnetic tapes (e.g., a magnetic tape), optical media, such as compact disc ROMs (CD-ROMs) and digital versatile discs (DVDs), magneto-optical media, such as floptical disks, ROMs, RAMs, flash memories, and/or the like. Examples of the program instructions may include not only machine language codes but also high-level language codes which are executable by various computing means using an interpreter. The aforementioned hardware devices may be configured to operate as one or more software modules to carry out various embodiments of the disclosure, and vice versa.

Modules or programming modules in accordance with various embodiments of the disclosure may include at least one or more of the aforementioned components, omit some of them, or further include other additional components. Operations performed by modules, programming modules or other components in accordance with various embodiments of the disclosure may be carried out sequentially, simultaneously, repeatedly, or heuristically. Furthermore, some of the operations may be performed in a different order, or omitted, or include other additional operation(s).

As is apparent from the foregoing description, according to various embodiments of the disclosure, an electronic device may include a connector that allows the electronic device to connect an antenna for receiving wireless communication data, as well as with an external device to perform designated functions. The electronic device may connect to a designated external device for performing a designated function via an antenna-connectable connector for receiving wireless communication data, performing the designated function, or may connect to an antenna, receiving wireless communication data, e.g., digital broadcast data or FM broadcast data.

According to various embodiments of the disclosure, the electronic device may have a USB type-C connector that may selectively connect one of the plurality of pins to a designated function circuit or a wireless communication circuit capable of receiving wireless communication data via an antenna. The electronic device may perform various designated functions or the functionality of receiving wireless communication data via an antenna, using a USB type-C connector, eliminating the need for an additional connector for attaching an antenna.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a wireless communication circuit; and
   a universal serial bus (USB) connector including:
      a housing forming an outer surface of the connector,
      an opening formed in at least a portion of the outer surface to allow an external connector to be coupled to the connector in a first direction or a second direction, and
      a board disposed inside the opening, the board having a first surface on which a plurality of first pins corresponding to the first direction are arranged and a second surface on which a plurality of second pins corresponding to the second direction are arranged,
   wherein the plurality of first pins include one or more first ground pins and one or more first signal pins,
   wherein the plurality of second pins include one or more second ground pins and one or more second signal pins,
   wherein the one or more first signal pins include at least one first signal pin selectively connectable with the wireless communication circuit and a designated function circuit, and
   wherein the one or more second signal pins include at least one second signal pin corresponding to the second direction of the at least one first signal pin, the at least one second signal pin selectively connectable with the designated function circuit and the wireless communication circuit.

2. The electronic device of claim 1, further comprising:
   at least one processor electrically connected with the connector and the wireless communication circuit,
   wherein the at least one processor is configured to selectively connect the at least one first signal pin or the at least one second signal pin to a corresponding one of the designated function circuit and the wireless communication circuit.

3. The electronic device of claim 2, further comprising:
   a voltage detecting circuit configured to detect a voltage supplied to at least one of the one or more first signal pins or the one or more second signal pins,
   wherein the at least one processor is further configured to selectively connect the at least one first signal pin or the at least one second signal pin to a corresponding one of the designated function circuit and the wireless communication circuit, based on the voltage detected by the voltage detecting circuit.

4. The electronic device of claim 1, wherein an external device including the external connector comprises an antenna configured to receive the wireless communication data.

5. The electronic device of claim 1, wherein an external device including the external connector comprises an antenna configured to receive wireless broadcast data.

6. The electronic device of claim 1, wherein an external device including the external connector comprises an antenna configured to receive digital multimedia broadcasting (DMB) data or frequency modulation (FM) broadcast data.

7. The electronic device of claim 1,
   wherein the connector comprises a USB type-C socket, and
   wherein the external connector comprises a USB type-C header.

8. An electronic device comprising:
a wireless communication circuit; and
a universal serial bus (USB) connector including:
- a housing forming an outer surface of the connector,
- an opening formed in at least a portion of the outer surface to allow an external connector to be coupled to the connector in a first direction or a second direction, and
- a board disposed inside the opening, the board having a first surface on which a plurality of first pins corresponding to the first direction are arranged and a second surface on which a plurality of second pins corresponding to the second direction are arranged, wherein the plurality of first pins include one or more first ground pins and one or more first signal pins,
wherein the plurality of second pins include one or more second ground pins and one or more second signal pins,
wherein the one or more first ground pins include at least one first ground pin selectively connectable with a ground and the wireless communication circuit, and
wherein the one or more second ground pins include at least one second ground pin corresponding to the second direction of the at least one first ground pin, the at least one second ground pin selectively connectable with the ground and the wireless communication circuit.

9. The electronic device of claim 8, further comprising:
at least one processor electrically connected with the connector and the wireless communication circuit,
wherein the at least one processor is configured to selectively connect the at least one first ground pin or the at least one second ground pin to a corresponding one of the ground and the wireless communication circuit.

10. The electronic device of claim 9, further comprising:
a voltage detecting circuit configured to detect a voltage supplied to at least one of the one or more first signal pins and the one or more second signal pins,
wherein the at least one processor is further configured to selectively connect the at least one first signal pin or the at least one second signal pin to a corresponding one of the ground and the wireless communication circuit, based on the voltage detected by the voltage detecting circuit.

11. The electronic device of claim 8, wherein an external device including the external connector comprises an antenna configured to receive the wireless communication data.

12. The electronic device of claim 8, wherein an external device including the external connector comprises an antenna configured to receive wireless broadcast data.

13. The electronic device of claim 8, wherein an external device including the external connector comprises an antenna configured to receive digital multimedia broadcasting (DMB) data or frequency modulation (FM) broadcast data.

14. The electronic device of claim 8,
wherein the connector comprises a USB type-C socket, and
wherein the external connector comprises a USB type-C header.

15. An electronic device comprising:
a wireless communication circuit; and
a universal serial bus (USB) connector including:
- a housing forming an outer surface of the connector,
- an opening formed in at least a portion of the outer surface to allow an external connector to be coupled to the connector in a first direction or a second direction,
- a board disposed inside the opening, the board having a first surface on which a plurality of first pins corresponding to the first direction are arranged and a second surface on which a plurality of second pins corresponding to the second direction are arranged,
- a first latch pin disposed on a first side of the board, the first latch pin configured to allow for electrical connection with the external connector, and corresponding to the first direction, and
- a second latch pin disposed on a second side of the board, the second latch pin configured to allow for electrical connection with the external connector, and corresponding to the second direction, wherein the plurality of first pins include one or more first ground pins and one or more first signal pins,
wherein the plurality of second pins include one or more second ground pins and one or more second signal pins, and
wherein at least one of the first latch pin or the second latch pin is selectively connected with the wireless communication circuit.

16. The electronic device of claim 15, further comprising:
at least one processor electrically connected with the connector and the wireless communication circuit,
wherein the at least one processor is configured to selectively connect at least one of the first latch pin or the second latch pin to the wireless communication circuit.

17. The electronic device of claim 16, further comprising:
a voltage detecting circuit configured to detect a voltage supplied to at least one of the one or more first signal pins or the one or more second signal pins,
wherein the at least one processor is further configured to selectively connect at least one of the first latch pin or the second latch pin to the wireless communication circuit based on the voltage detected by the voltage detecting circuit.

18. The electronic device of claim 15, wherein an external device including the external connector comprises an antenna configured to receive the wireless communication data.

19. The electronic device of claim 15, wherein an external device including the external connector comprises an antenna configured to receive wireless broadcast data.

20. The electronic device of claim 15, wherein an external device including the external connector comprises an antenna configured to receive digital multimedia broadcasting (DMB) data or frequency modulation (FM) broadcast data.

* * * * *